(12) United States Patent
Akabane et al.

(10) Patent No.: US 9,423,572 B2
(45) Date of Patent: Aug. 23, 2016

(54) OPTICAL CONNECTOR AND METHOD FOR MANUFACTURING OPTICAL CONNECTOR

(71) Applicant: FUJITSU COMPONENT LIMITED, Tokyo (JP)

(72) Inventors: Ayumu Akabane, Tokyo (JP); Satoshi Moriyama, Tokyo (JP); Osamu Daikuhara, Tokyo (JP); Takeshi Komiyama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 68 days.

(21) Appl. No.: 14/623,952

(22) Filed: Feb. 17, 2015

(65) Prior Publication Data

US 2015/0234129 A1    Aug. 20, 2015

(30) Foreign Application Priority Data

Feb. 20, 2014  (JP) ................................. 2014-030904

(51) Int. Cl.
*G02B 6/36* (2006.01)
*G02B 6/38* (2006.01)

(52) U.S. Cl.
CPC ............ *G02B 6/3882* (2013.01); *G02B 6/3853* (2013.01); *G02B 6/3855* (2013.01); *G02B 6/3885* (2013.01); *G02B 6/3867* (2013.01)

(58) Field of Classification Search
None
See application file for complete search history.

(56) References Cited

U.S. PATENT DOCUMENTS

| | | | | |
|---|---|---|---|---|
| 2010/0014815 A1* | 1/2010 | Ohmura | ............... | G02B 6/3855 385/83 |
| 2013/0136399 A1* | 5/2013 | Jubin | ................... | G02B 6/3676 385/78 |
| 2013/0251315 A1* | 9/2013 | Isenhour | .................. | G02B 6/42 385/93 |

FOREIGN PATENT DOCUMENTS

JP        2008-089879        4/2008

* cited by examiner

*Primary Examiner* — Hemang Sanghavi
(74) *Attorney, Agent, or Firm* — IPUSA, PLLC

(57) ABSTRACT

An optical connector includes an optical waveguide having multiple cores for propagating light arranged in a width direction, a connector body including a distal end reference surface that contacts a distal end of the optical waveguide, a first reference surface that contacts a first surface of the optical waveguide, a lens array that face the multiple cores, and an opening, and a positioning member that is mounted to the opening, the positioning member including a pressing part that contacts a second surface of the optical waveguide and presses the optical waveguide to the first reference surface, and a first positioning part that contacts a first side of the optical waveguide in the width direction.

10 Claims, 35 Drawing Sheets

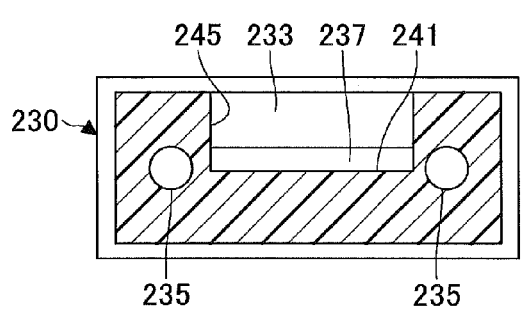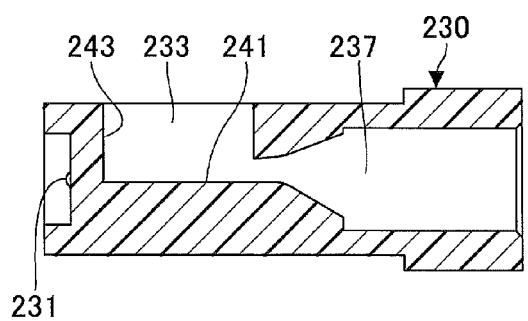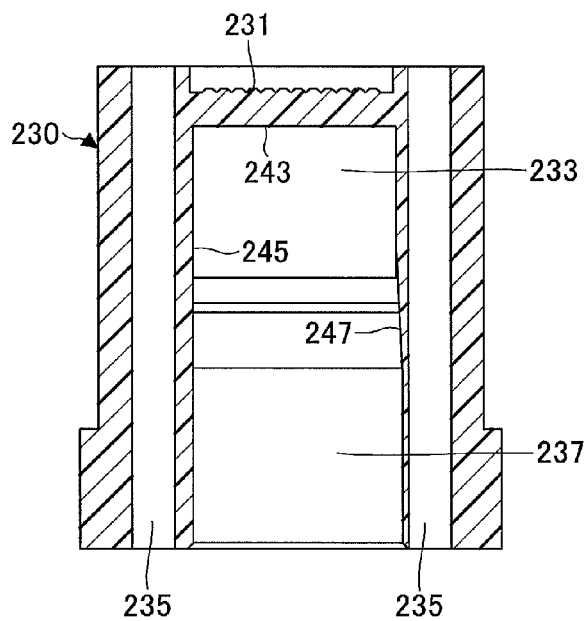

FIG.16A
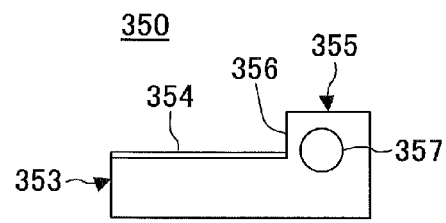
FIG.16B
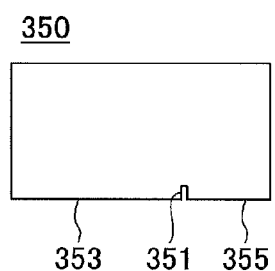
FIG.16C          FIG.16D          FIG.16E
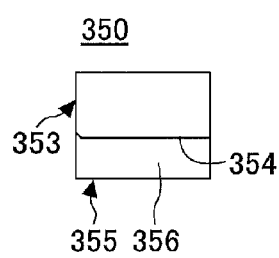    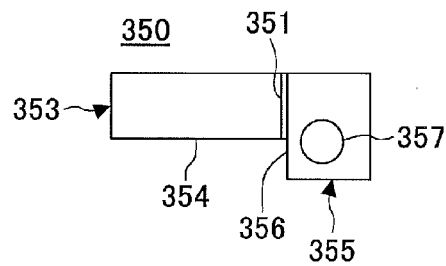    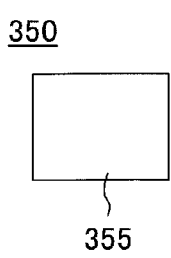
FIG.16F
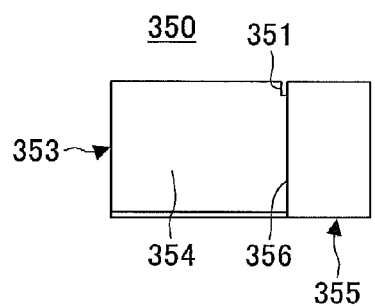

FIG.21A
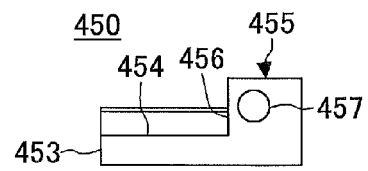
FIG.21B
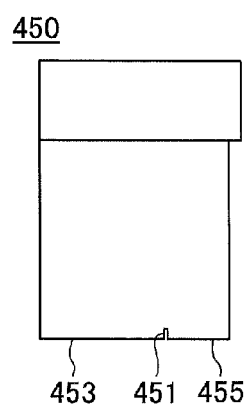
FIG.21C  FIG.21D  FIG.21E
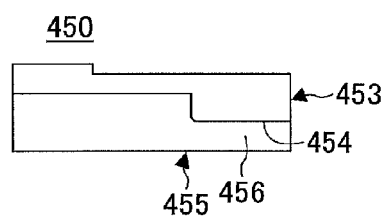 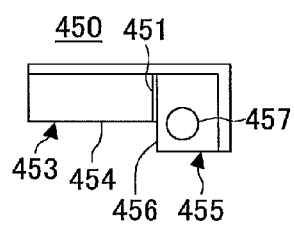 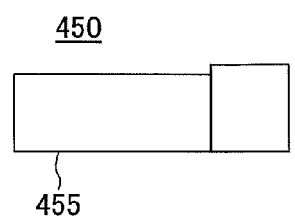
FIG.21F
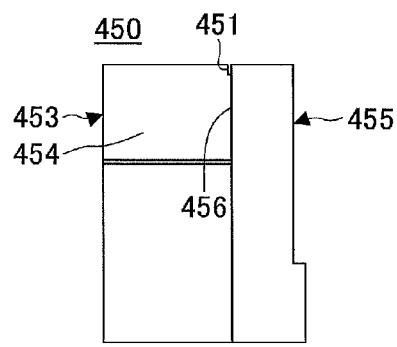

634  633  632

635  631  635

635  635

FIG.33A
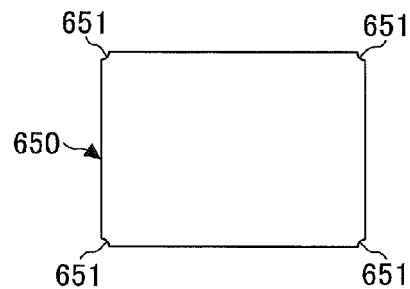
FIG.33B  FIG.33C  FIG.33D
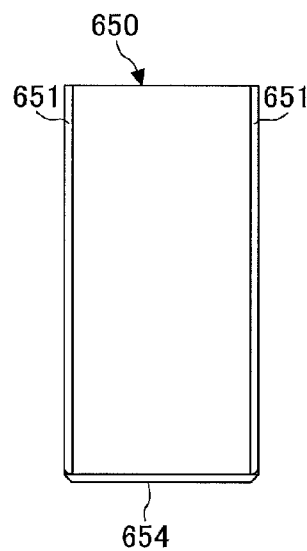 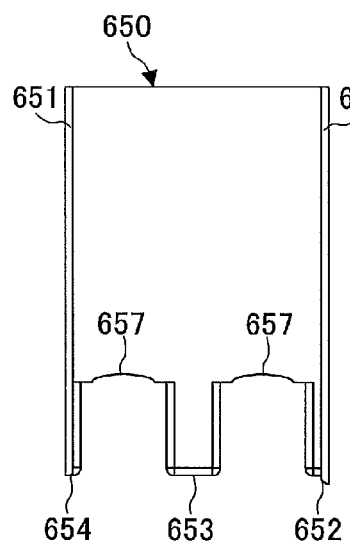 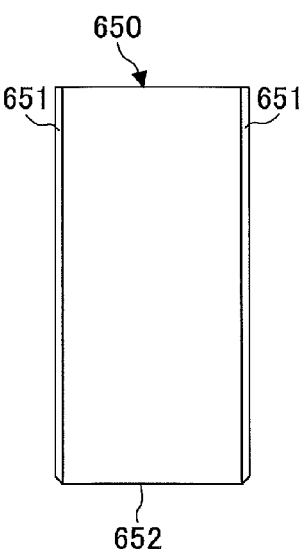
FIG.33E
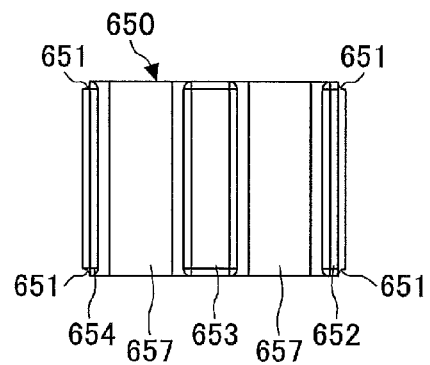

OPTICAL CONNECTOR AND METHOD FOR MANUFACTURING OPTICAL CONNECTOR

CROSS-REFERENCE TO RELATED APPLICATIONS

This application is based upon and claims the benefit of priority of the prior Japanese Patent Application No. 2014-030904 filed on Feb. 20, 2014, the entire contents of which are hereby incorporated by reference.

BACKGROUND

1. Field of the Invention

The present invention relates to an optical connector and a method for manufacturing the optical connector.

2. Description of the Related Art

An optical connector for connecting optical waveguides may include a lens provided in a position facing a core that propagates light. In order to reduce connection loss of the optical connector, the core and the lens are to be accurately positioned facing each other.

For example, Japanese Laid-Open Patent Publication No. 2008-89879 discloses an optical coupling device including a lens array that has an engagement protrusion and an optical waveguide that has a tapered positioning groove for engaging the engagement protrusion. The optical coupling device positions an optical axis by engaging the engagement protrusion to the tapered positioning groove.

However, because the optical coupling device requires the engagement protrusion and the tapered positioning groove, the structure of the optical coupling device is complicated. Further, the optical coupling device having complicatedly-shaped components is difficult to form with high dimensional accuracy. Thus, it may be difficult to reduce connection loss because high accuracy positioning between the lens array and the optical waveguide is difficult.

SUMMARY

An embodiment of the present invention provides an optical connector includes an optical waveguide having multiple cores for propagating light arranged in a width direction, a connector body including a distal end reference surface that contacts a distal end of the optical waveguide, a first reference surface that contacts a first surface of the optical waveguide, a lens array that face the multiple cores, and an opening, and a positioning member that is mounted to the opening, the positioning member including a pressing part that contacts a second surface of the optical waveguide and presses the optical waveguide to the first reference surface, and a first positioning part that contacts a first side of the optical waveguide in the width direction.

Other objects and further features of the present invention will be apparent from the following detailed description when read in conjunction with the accompanying drawings.

BRIEF DESCRIPTION OF THE DRAWINGS

FIG. 9A-9C are cross-sectional views illustrating configurations of the connector body of the second embodiment;

FIGS. 16A-16F are schematic diagrams illustrating configurations of a positioning member of the third embodiment;

FIGS. 21A-21F are schematic diagrams illustrating configurations of a positioning member of the fourth embodiment;

FIGS. 33A-33E are schematic diagrams illustrating configurations of a jig of the sixth embodiment;

DESCRIPTION OF EMBODIMENTS

Figure 1:
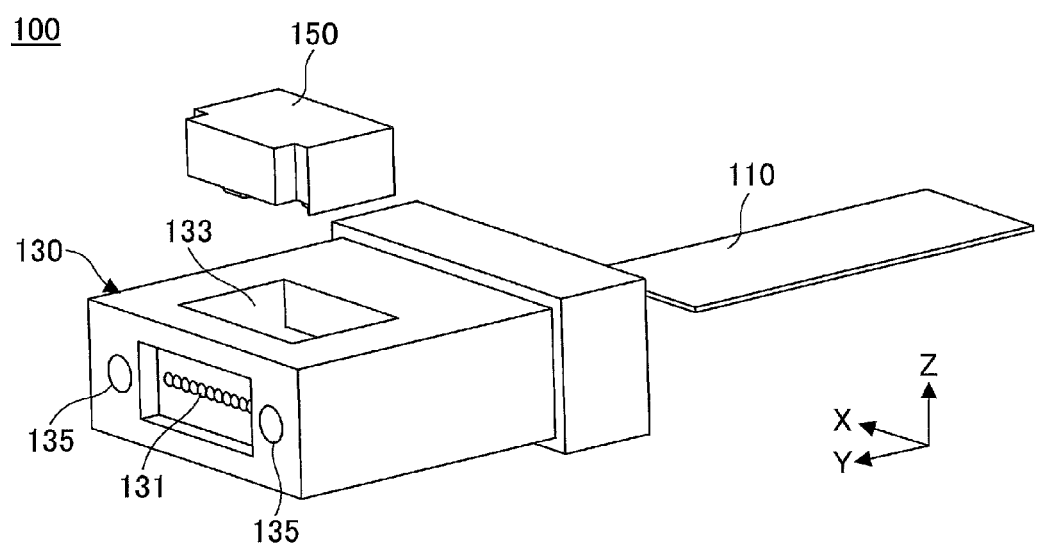
FIG. 1 is a schematic diagram illustrating a configuration of an optical connector according to a first embodiment of the present invention.

In the following, embodiments of the present invention are described with reference to the accompanying drawings. It is to be noted that like components are denoted with like reference numerals throughout the following description and drawings.

First Embodiment (Optical Connector)

FIG. 1 is a schematic diagram illustrating a configuration of an optical connector 100 according to a first embodiment of the present invention. The optical connector 100 includes an optical waveguide 110, a connector body 130, and a positioning member 150 as illustrated in FIG. 1.

In the below-described drawings, an X-direction indicates a width direction of the optical connector 100, a Y-direction indicates a depth direction of the optical connector 100, and a Z-direction indicates a height direction of the optical connector 100. In the following description, a surface of the connector body 130 on a side of a lens array 131 in the Y-direction may be referred to as a front surface of the connector body 130, a surface of the connector body 130 that is on the opposite side of the lens array 131 in the Y direction (see, for example, right end in FIG. 2C) may be referred to as a rear surface of the connector body 130, a side of the connector body 130 on a side of an opening 133 in the Z-direction may be referred to as an upper side of the connector body 130, and a side of the connector body 130 on the opposite side of the opening 133 may be referred to as a lower side of the connector body 130.

The optical waveguide 110 has a flat film-like shape. Multiple cores 111 (illustrated in FIG. 6A) that propagate light are arranged in the X-direction inside the optical waveguide 110. The core 111 may be formed of, for example, quartz glass. A cladding covers the core 111. The cladding may be formed of, for example, a transparent resin having a lower refractive index than the core 111.

The connector body 130 includes a lens array 131, an opening 133, and a connection pin hole 135 into which a connection pin is inserted when the optical connector 100 is connected to another connector. The connector body 130 is molded by using a resin having sufficient transmittance that is transparent with respect to a propagated light (e.g., λ=850 nm). The lens array 131 has multiple lenses arranged in the X-direction. Each lens is provided in a manner facing an end of a corresponding core 111 of the optical waveguide 110.

The opening 133 is provided on the upper surface of the connector body 130. A positioning member 150 is to be mounted to the opening 133. The positioning member 150 is mounted to the connector body 130 by inserting the positioning member 150 into the opening 133 of the connector body 130. The position of the optical waveguide 110 to be set in the connector body 130 is defined by mounting the positioning member 150 to the opening 133, and multiple cores 111 are provided in a manner facing the lens array 131.

(Connector Body)

Figure 2A:
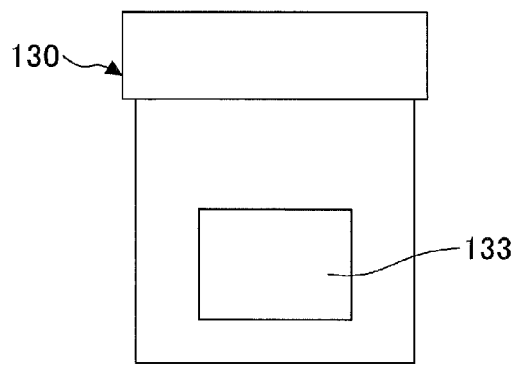
FIGS. 2A-2E are schematic diagrams illustrating configurations of a connector body of the first embodiment.
Figure 2B:
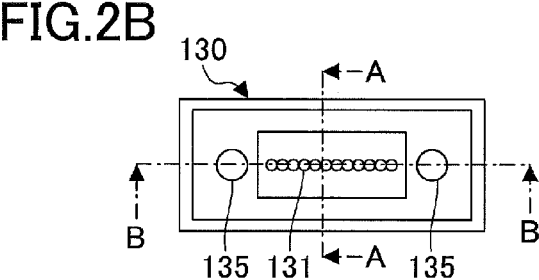
Figure 2C:
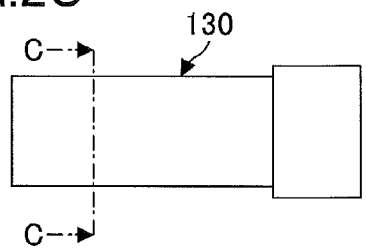
Figure 2D:
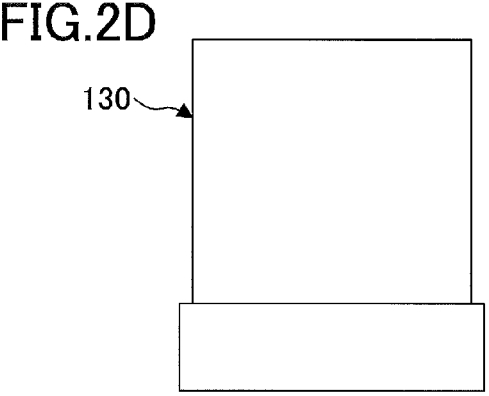
Figure 2E:
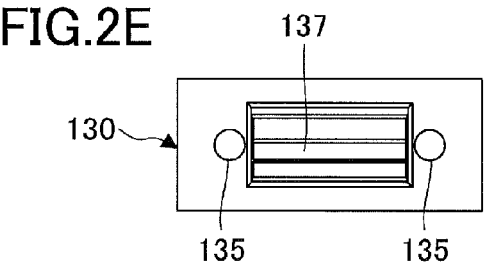

FIGS. 2A-2E are schematic diagrams illustrating configurations of the connector body 130 of the first embodiment. FIG. 2A is a plan view of the connector body 130, FIG. 2B is a front view of the connector body 130, FIG. 2C is a side view of the connector body 130, FIG. 2D is a bottom view of the connector body 130, and FIG. 2E is a rear view of the connector body 130.

The opening 133 having a rectangular shape is provided on the upper surface of the connector body 130 as illustrated in FIG. 2A. The lens array 131 is provided on the front surface of the connector body 130 as illustrated in FIG. 2B. The connection pin hole 135 is provided on the front surface of the connector body 130. The connection pin hole 135 may be formed to penetrate the connector body 130 from the front surface of the connector body 130 to the rear surface of the connector body 130. Alternatively, the connection pin hole 135 may be formed without penetrating the rear surface of the connector body 130. As illustrated in FIG. 2E, an insertion hole 137 into which the optical waveguide 110 is inserted is provided on the rear surface of the connector body 130.

Figure 3A:
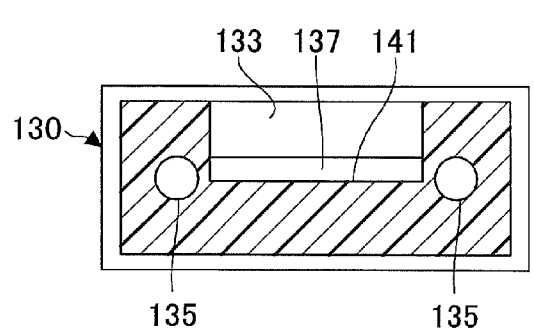
FIGS. 3A-3C are cross-sectional views illustrating configurations of the connector body of the first embodiment.
Figure 3B:
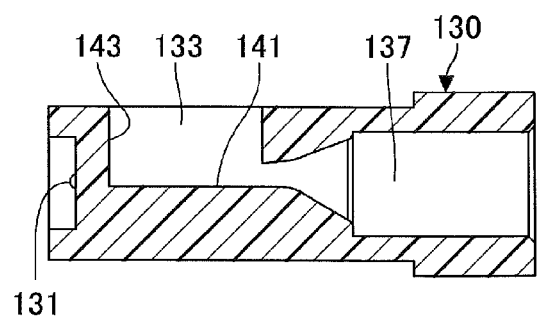
Figure 3C:
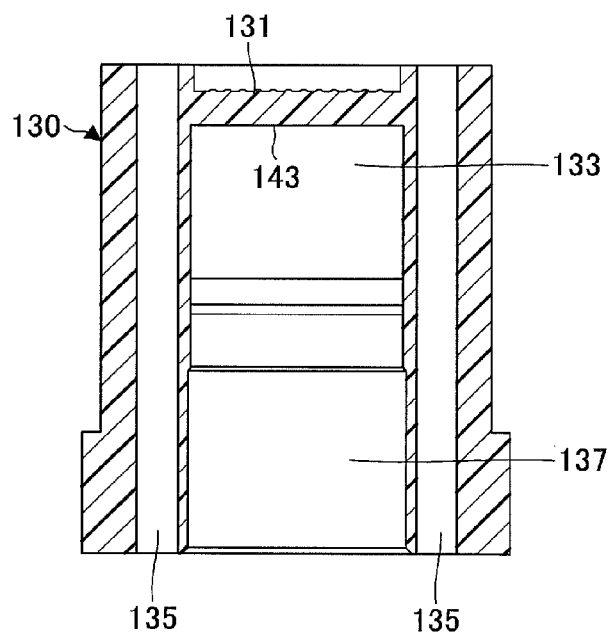

FIGS. 3A-3C are cross-sectional views illustrating configurations of the connector body 130 of the first embodiment. FIG. 3A is a cross-sectional view of the connector body 130 taken along line C-C of FIG. 2C. FIG. 3B is a cross-sectional view of the connector body 130 taken along line A-A of FIG. 2B. FIG. 3C is a cross-sectional view of the connector body 130 taken along line B-B of FIG. 2B.

The connector body 130 includes a space that communicates with the opening 133 and the insertion hole 137. The optical waveguide 110 is set in the connector body 130 by inserting the optical waveguide 110 into the space. As illustrated in FIGS. 3A and 3B, the connector body 130 includes a reference surface 141 for defining the position of the optical waveguide 110 with respect to the height direction in a manner that the reference surface 141 contacts the lower surface of the optical waveguide 110 and the end surfaces of the cores 111 face the lens array 131. The connector body 130 also includes a distal end reference surface 143 as illustrated in FIGS. 3B and 3C for defining the position of the optical waveguide 110 with respect to the depth direction of the connector body 130 in a manner that the distal end reference surface 143 contacts a distal end of the optical waveguide 110. The optical waveguide 110 is inserted into the connector body 130 from the insertion hole 137 and is set in the connector body 130 in a manner having its distal end contacting the distal end reference surface 143 and its lower surface contacting the reference surface 141.

Two connection pin holes 135 are provided one on each side in the width direction of the connector body 130 in a manner that the lens array 131 is provided therebetween. The connection pin holes 135 are provided to extend in parallel from the front surface of the connector body 130 in the depth direction of the connector body 130. Although FIG. 3C illustrates the connection pin holes 135 penetrating the connector body 130 from the front surface of the connector body 130 to the rear surface of the connector body 130, the connection pin holes 135 may be formed without penetrating the rear surface of the connector body 130.

(Positioning Member)

Figure 4A:
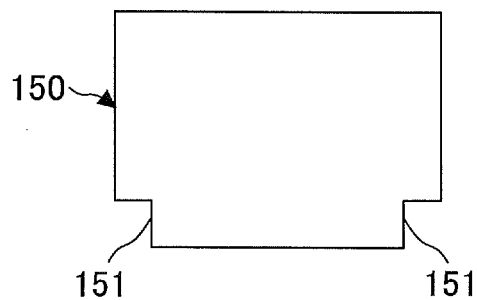
FIGS. 4A-4D are schematic diagrams illustrating configurations of a positioning member of the first embodiment.
Figure 4B:
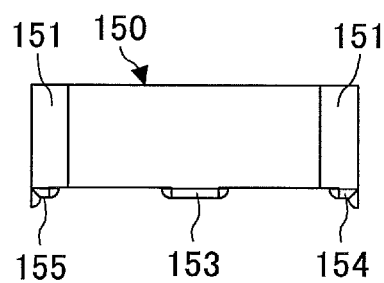
Figure 4C:
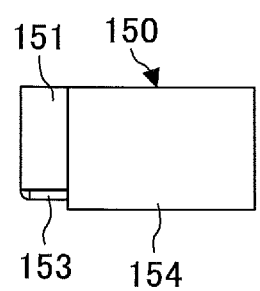
Figure 4D:
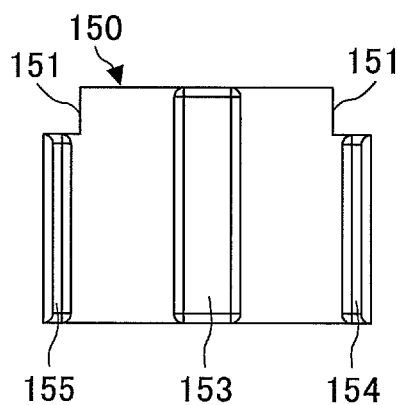

FIGS. 4A-4D are schematic diagrams illustrating the positioning member 150 of the first embodiment. FIG. 4A is a top plan view of the positioning member 150. FIG. 4B is a front view of the positioning member 150. FIG. 4C is a side view of the positioning member 150. FIG. 4D is a bottom view of the positioning member 150.

As illustrated in FIGS. 4B and 4D, the positioning member 150 includes a center pressing part 153, a first positioning part 154, and a second positioning part 155 that protrude from the lower surface of the positioning member 150. As illustrated in FIG. 4D, each of the center pressing part 153, the first positioning part 154, and the second positioning part 155 extends in the depth direction of the positioning member 150.

In a state where the positioning member 150 is mounted to the connector body 130, the center pressing part 153 contacts the upper surface of the optical waveguide 110 and presses the optical waveguide 110 to the reference surface 141 of the connector body 130. By exerting pressure from the center pressure part 153 to the optical waveguide 110, the bottom surface of the optical waveguide 110 contacts with the reference surface 141, and the position of the optical waveguide 110 is defined with respect to the height direction.

The center pressing part 153 is preferred to be provided in the positioning member 150 in a manner pressing a part of the optical waveguide 110 that does not have the core 111 provided therein. The positioning member 150 may include multiple center pressing parts 153. In a case where the positioning member 150 includes multiple center pressing parts 153, the multiple center pressing parts 153 are preferred to be positioned in a manner not pressing the cores 111 of the optical waveguide 110.

Further, fine-sized irregularities may be formed on the lower surface of the center pressing part 153. Adhesive applied between the optical waveguide 110 and the center pressing part 153 spread throughout a space between the optical waveguide 110 and the center pressing part 153 by a capillary phenomenon caused by the fine-sized irregularities, and the bond between the optical waveguide 110 and the center pressing part 153 can be strengthened.

In a state where the positioning member 150 is mounted to the connector body 130, each of the first positioning part 154 and the second positioning part 155 contacts a width direction end of the optical waveguide 110, so that the position of the optical waveguide 110 can be defined with respect to the width direction.

As illustrated in FIGS. 4A-4D, the positioning member 150 includes air-vent grooves 151 each being provided, for example, at a corner on the front surface of the positioning member 150. In a state where the positioning member 150 is mounted to the opening 133 of the connector body 130, the air-vent groove 151 and the sidewall of the opening 133 form a gap that leads from an installation space of the optical waveguide 10 to the outside of the connector body 130. The positioning member 150 can be easily mounted to the connector body 130 because the air inside the connector body 130 is released outside from the air-vent groove 151 when the positioning member 150 is inserted into the opening 133 of the connector body 130.

Figure 5:
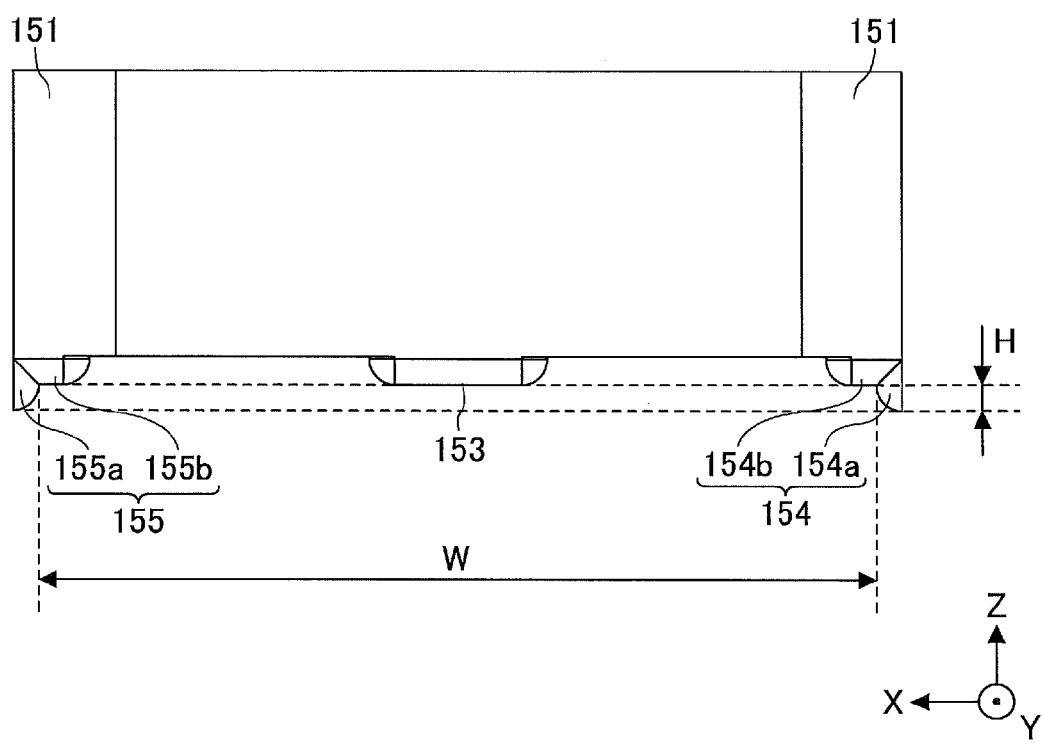
FIG. 5 is an enlarged view of a configuration of the positioning member of the first embodiment.

FIG. 5 is an enlarged front view of the positioning member 150 of the first embodiment.

The first positioning part 154 includes a first guide 154a provided on a width direction end of the positioning member 150 and a first pressing part 154b provided on an inner side (the side toward the center pressing part 153) of the first guide 154a. The first guide 154a includes an inner surface that is inclined and tapered toward a lower end of the first guide 154a.

The second positioning part 155 includes a second guide 155a provided on a width direction end of the positioning member 150 and a second pressing part 155b provided on an inner side (the side toward the center pressing part 153) of the second guide 155a. The second guide 155a includes an inner surface that is inclined and tapered toward a lower end of the second guide 155a.

The interval W between the inner surface of the first guide 154a and the inner surface of the second guide 155a in the X-direction may be equal to the width of the optical waveguide 110.

The height of the first guide 154a from the lower surface of the positioning member 150 to the lower end of the first guide 154a is equal to the height of the second guide 155a from the lower surface of the positioning member 150 to the lower end of the second guide 155a. Further, the height of center pressing part 153, the height of the first pressing part 154b, and the height of the second pressing part 155b relative to the lower surface of the positioning member 150 are equal. Further, with respect to the Z-direction, the heights H from the lower surfaces of the center pressing part 153, the first pressing part 154a and the second pressing part 154b to the lower ends of the first guide 154a and the second guide 154b are equal to the thickness of the optical waveguide 110.

(Positioning of Optical Waveguide)

Figure 6A:
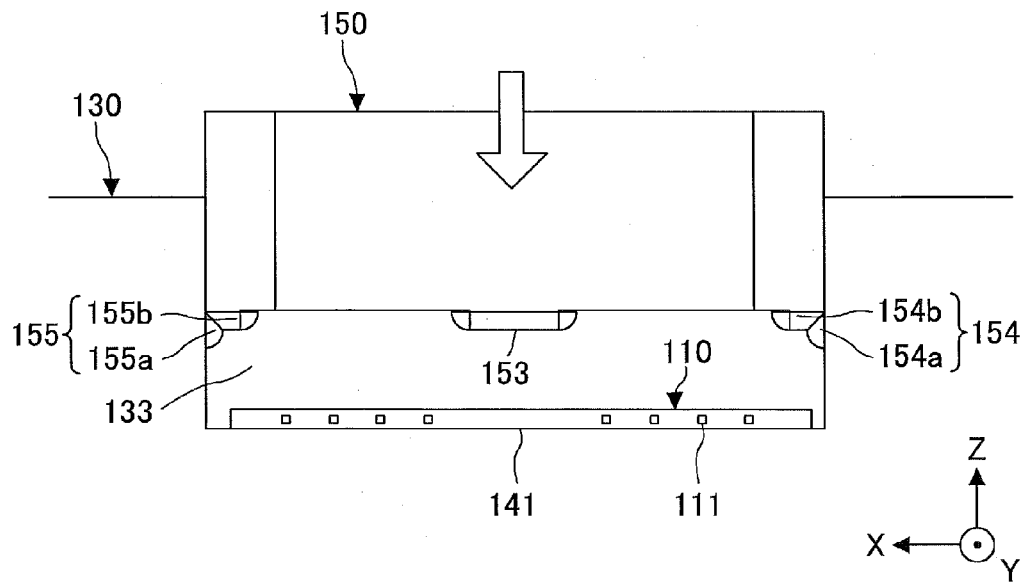
FIGS. 6A and 6B are schematic diagrams for describing the positioning of an optical waveguide of the first embodiment.
Figure 6B:
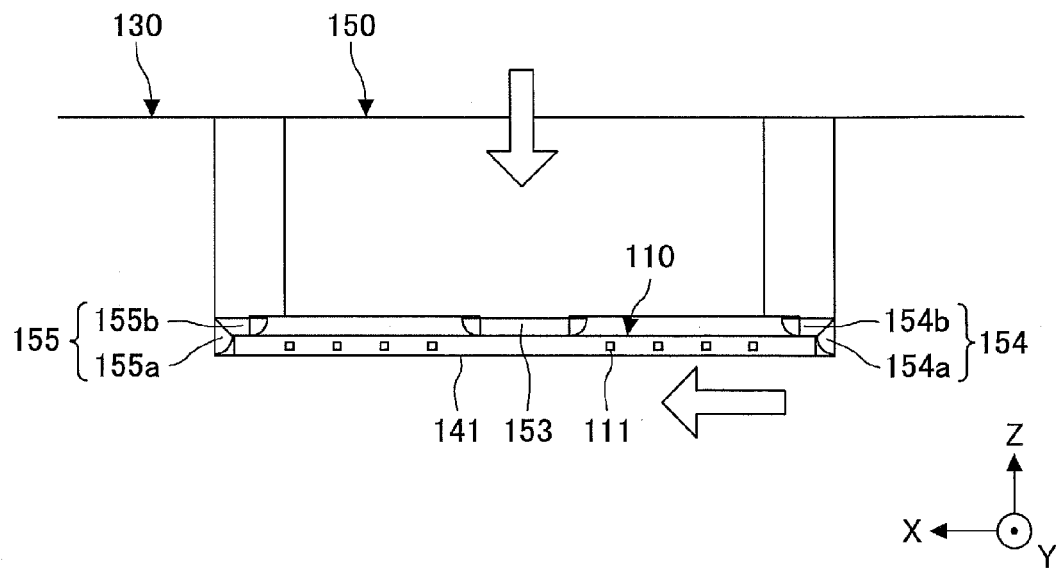

FIGS. 6A and 6B are schematic diagrams for describing the positioning of the optical waveguide 110 of the first embodiment.

As illustrated in FIG. 6A, the optical waveguide 110 including multiple cores 111 arranged in the X-direction is set on the reference surface 141 in a manner that a distal end of the optical waveguide 110 abuts a distal end reference surface 143 (not illustrated in FIGS. 6A and 6B) of the connector body 130. The positioning member 150 is inserted into the opening 133 of the connector body 130 in this state where the optical waveguide 110 is set in the connector body 130. In the example illustrated in FIG. 6A, the optical waveguide 110 is deviated in the width direction such that the optical waveguide 110 is positioned more toward the first positioning part 154.

When the positioning member 150 is inserted into the opening 133 of the connector body 130 as illustrated in FIG. 6A, the first guide 154a of the first positioning part 154 contacts the width direction end of the optical waveguide 110 (right end in FIG. 6A). When the positioning member 150 is inserted further into the opening 133 in the state where the first guide 154a is contacting the optical waveguide 110, the inclined inner surface of the first guide 154a presses the optical waveguide 110 and causes the optical waveguide 110 to move in the width direction (leftward in FIG. 6A).

As illustrated in FIG. 6B, when the positioning member 150 is inserted completely into the opening 133 of the connector body 130, the center pressing part 153, the first pressing part 154b, and the second pressing part 155b press the reference surface 141, so that the position of the optical waveguide 110 is defined with respect to the height direction. The optical waveguide 110 that has been moved leftward in FIG. 6B by the first guide 154a is fixed in place by having the width direction ends of the optical waveguide 110 contact the first guide 154a and the second guide 155a, respectively. Thereby, the position of the optical waveguide 110 is defined with respect to the width direction.

By defining the position of the optical waveguide 110 with respect to the height direction and the width direction, the end surfaces of the multiple cores 111 are provided facing corresponding lenses of the lens array 131 of the connector body 130.

Even in a case where the optical waveguide 110 is deviated in the width direction such that the optical waveguide 110 is positioned more toward the first positioning part 154, the second guide 155a presses the optical waveguide 110 and moves the optical waveguide 110 in the width direction.

Thereby, the position of the optical waveguide 110 can be defined with respect to the width direction of the connector body 110.

With the optical connector 100 of the first embodiment, the position of the optical waveguide 110 can be defined by engaging the positioning member 150 to the opening 133 of the connector body 130. Further, high accuracy alignment between the multiple cores 111 and the lens array 113 can be achieved with a simple configuration.

Second Embodiment

Next, a second embodiment of the present invention is described with reference to the accompanying drawings. In the second embodiment, like components/parts are denoted with like reference numerals as the reference numerals of the first embodiment and are not further explained.
(Optical Connector)

Figure 7:
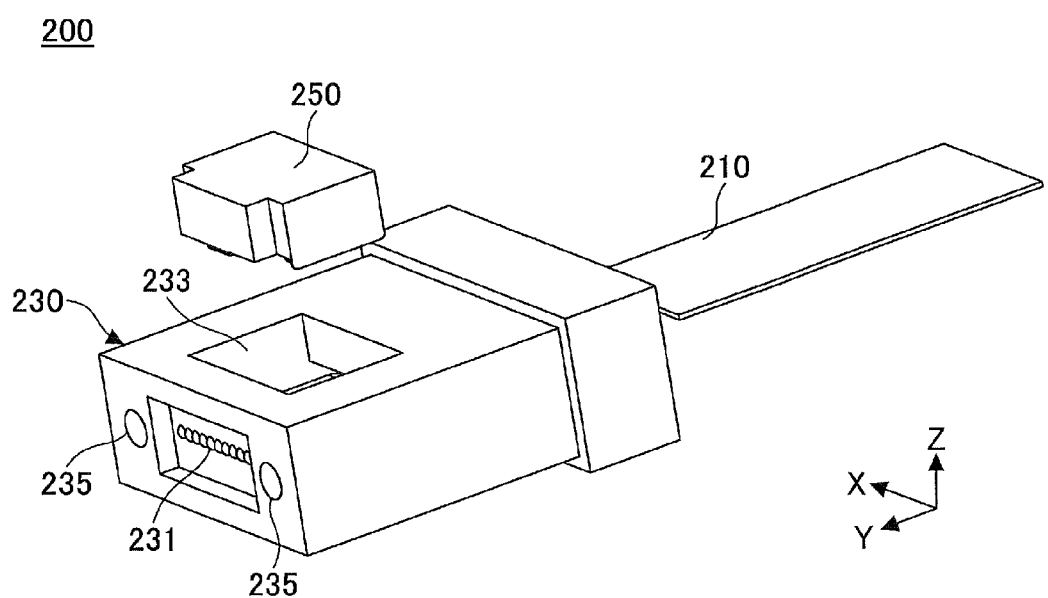
FIG. 7 is a schematic diagram illustrating a configuration of an optical connector according to a second embodiment of the present invention.

FIG. 7 is a schematic diagram illustrating a configuration of an optical connector 200 according to the second embodiment. The optical connector 200 includes an optical waveguide 210, a connector body 230, and a positioning member 250 as illustrated in FIG. 7.

Similar to the optical waveguide 110 of the first embodiment, the optical waveguide 210 has a flat film-like shape. Multiple cores 211 that propagate light are arranged in the X-direction inside the optical waveguide 210.

The connector body 230 includes a lens array 231, an opening 233, and a connection pin hole 235. The connector body 230 is molded by using a resin that is transparent with respect to a propagated light. The lens array 231 has multiple lenses arranged in the X-direction. Each lens is provided in a manner facing an end of a corresponding core 211 of the optical waveguide 210. The opening 233 is provided on the side of an upper surface of the connector body 230. A positioning member 250 is to be mounted to the opening 233. The positioning member 250 is mounted to the connector body 230 by inserting the positioning member 250 into the opening 233 of the connector body 230. The position of the optical waveguide 210 to be set in the connector body 230 is defined by mounting the positioning member 250 to the opening 233 so that multiple cores 211 are facing the lens array 231 of the connector body 230.
(Connector Body)

Figure 8A:
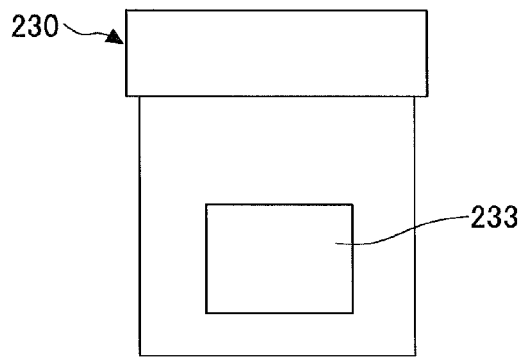
FIGS. 8A-8E are schematic diagrams illustrating configurations of a connector body of the second embodiment.
Figure 8B:
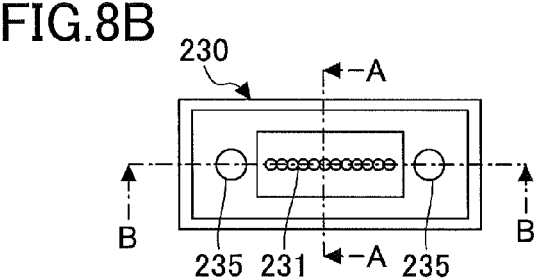
Figure 8C:
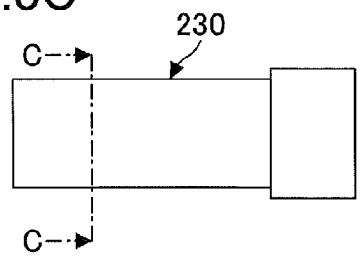
Figure 8D:
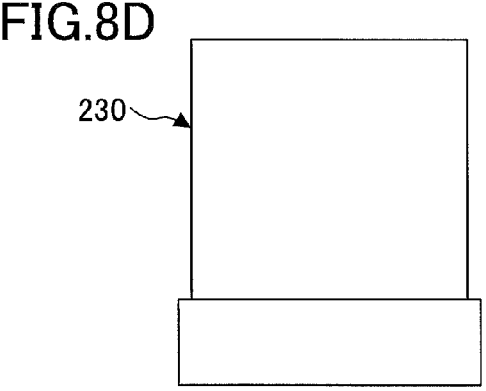
Figure 8E:
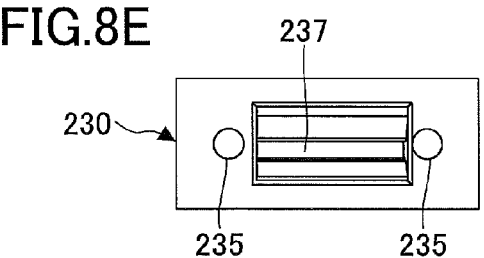

FIGS. 8A-8E are schematic diagrams illustrating configurations of the connector body 230 of the second embodiment. FIG. 8A is a plan view of the connector body 230, FIG. 8B is a front view of the connector body 230, FIG. 8C is a side view of the connector body 230, FIG. 8D is a bottom view of the connector body 230, and FIG. 8E is a rear view of the connector body 230.

The opening 233 having a rectangular shape is provided on the upper surface of the connector body 230 as illustrated in FIG. 8A. The lens array 231 is provided on the front surface of the connector body 230 as illustrated in FIG. 8B. The connection pin hole 235 into which a connection pin is inserted is provided in the connector body 130. As illustrated in FIG. 8E, an insertion hole 237 into which the optical waveguide 210 is inserted is provided on the rear surface of the connector body 230.

FIGS. 9A-9C are cross-sectional views illustrating configurations of the connector body 230 of the second embodiment. FIG. 9A is a cross-sectional view of the connector body 230 taken along line C-C of FIG. 8C. FIG. 9B is a cross-sectional view of the connector body 230 taken along line A-A of FIG. 8B. FIG. 9C is a cross-sectional view of the connector body 230 taken along line B-B of FIG. 8B.

The connector body 230 includes a space that communicates with the opening 233 and the insertion hole 237. The optical waveguide 210 is set in the connector body 230 by inserting the optical waveguide 210 into the space. As illustrated in FIGS. 9A and 9B, the connector body 230 includes a first reference surface 241 for defining the position of the optical waveguide 210 with respect to the height direction in a manner that the first reference surface 241 contacts the lower surface of the optical waveguide 210 and the end surface of the core 211 faces the lens array 231. The connector body 230 also includes a distal end reference surface 243 for defining the position of the optical waveguide 210 with respect to the depth direction in a manner that distal end reference surface 243 contacts a distal end of the optical waveguide 210 as illustrated in FIGS. 9B and 9C.

As illustrated in FIGS. 9A and 9B, the connector body also includes a second reference surface 245 for defining the position of the optical waveguide 210 with respect to the width direction in a manner that the second reference surface 245 contacts the width direction end of the optical waveguide 210 (left end in FIG. 9C). A surface of the opening 233 facing the second reference surface 245 is provided with an inclined surface 247 in a manner that a space between the second reference surface 245 and the inclined surface 247 becomes narrower toward the lens array 231.

One width direction end of the optical waveguide 210 (right end in FIG. 9C) is guided by the inclined surface 247 whereas the other width direction end of the optical waveguide 210 is positioned in the vicinity of the second reference surface 245 when the optical waveguide 210 is inserted into the insertion hole 237.

The optical waveguide 210 is inserted into the connector body 230 until the distal end of the optical waveguide 210 contacts the distal end reference surface 243 and the lower surface of the optical waveguide 210 contacts the first reference surface 241.

Two connection pin holes 235 are provided one on each side of the connector body 230 in the width direction in a manner that the lens array 231 is provided therebetween.
(Positioning Member)

Figure 10A:
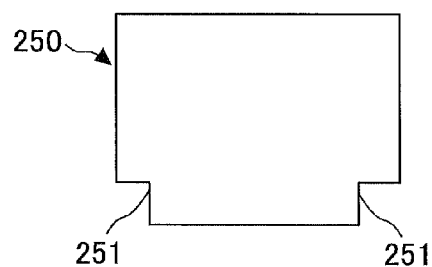
FIGS. 10A-10E are schematic diagrams illustrating configurations of a positioning member of the second embodiment.
Figure 10B:
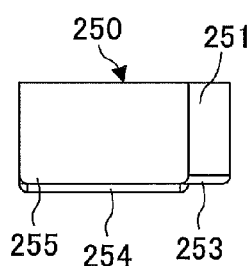
Figure 10C:
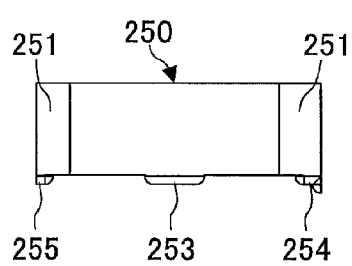
Figure 10D:
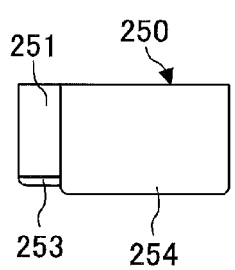
Figure 10E:
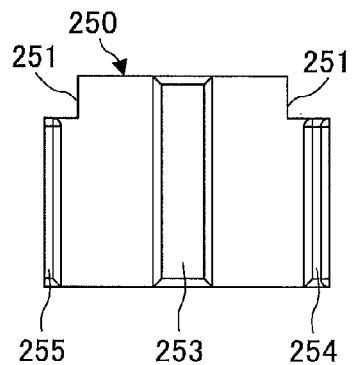

FIGS. 10A-10E are schematic diagrams illustrating the positioning member 250 of the second embodiment. FIG. 10A is a top plan view of the positioning member 250. FIG. 10B is a left side view of the positioning member 250. FIG. 10C is a front view of the positioning member 250. FIG. 10D is a right side view of the positioning member 250. FIG. 10E is a bottom view of the positioning member 250.

As illustrated in FIGS. 10A-10E, the positioning member 250 includes air-vent grooves 251. The air-vent groove 251 and the sidewall of the opening 233 form a gap that leads from an installation space of the optical waveguide 210 to the outside of the connector body 230 in a state where the positioning member 250 is mounted to the opening 233 of the connector body 230.

As illustrated in FIGS. 10B-10E, the positioning member 250 includes a center pressing part 253, a positioning part 254, and a side pressing part 255 that protrude from the lower surface of the positioning member 250 and extend in the depth direction of the positioning member 250.

In a state where the positioning member 250 is mounted to the connector body 230, the center pressing part 253 contacts the upper surface of the optical waveguide 210 and presses the optical waveguide 210 to the first reference surface 241 of the connector body 230. Further, in a state where the positioning member 250 is mounted to the connector body 230, the side pressing part 255 contacts the upper surface of the optical waveguide 210 and presses the optical waveguide 210 to the first reference surface 241 of the connector body 230. The bottom surface of the optical waveguide comes into contact with the first reference surface when the optical waveguide is pushed by the center pressuring part 253 and the side pressing part 255, and the position of the optical waveguide 210 in the height direction is defined.

In a state where the positioning member 250 is mounted to the connector body 230, the positioning part 154 contacts a width direction end of the optical waveguide 210. Because the width direction end of the optical waveguide 210 contacts the positioning part 254 and the second reference surface 245 of the connector body 230, the position of the optical waveguide 210 is defined with respect to the width direction.

Figure 11:
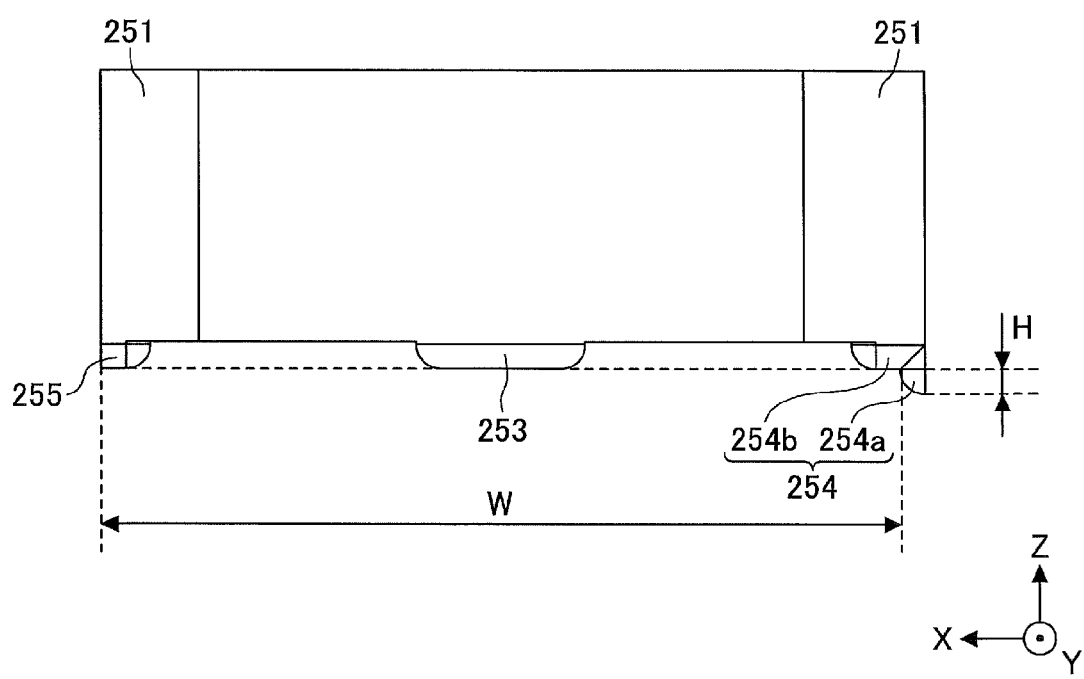
FIG. 11 is an enlarged view of a configuration of the positioning member of the second embodiment.

FIG. 11 is an enlarged front view of the positioning member 250 of the second embodiment.

The positioning part 254 includes a guide 254a provided on a width direction end of the positioning member 250 (right end in FIG. 11) and a pressing part 254b provided on an inner side (the side toward the center pressing part 253) of the guide 254a. The guide 254a includes an inner surface that is inclined and tapered toward a lower end of the guide 254a.

The interval W between the inner surface of the guide 254a and the outer surface of the side pressing part 255 in the X-direction is equal to the width of the optical waveguide 210.

The height of the center pressing part 253, the side pressing part 255, and the pressing part 254b relative to the lower surface of the positioning member 250 are equal. The heights from the lower surfaces of the center pressing part 253, the side pressing part 255, and the pressing part 254b to the lower end of the guide 254a are equal to the thickness of the optical waveguide 210.

(Positioning of Optical Waveguide)

Figure 12A:
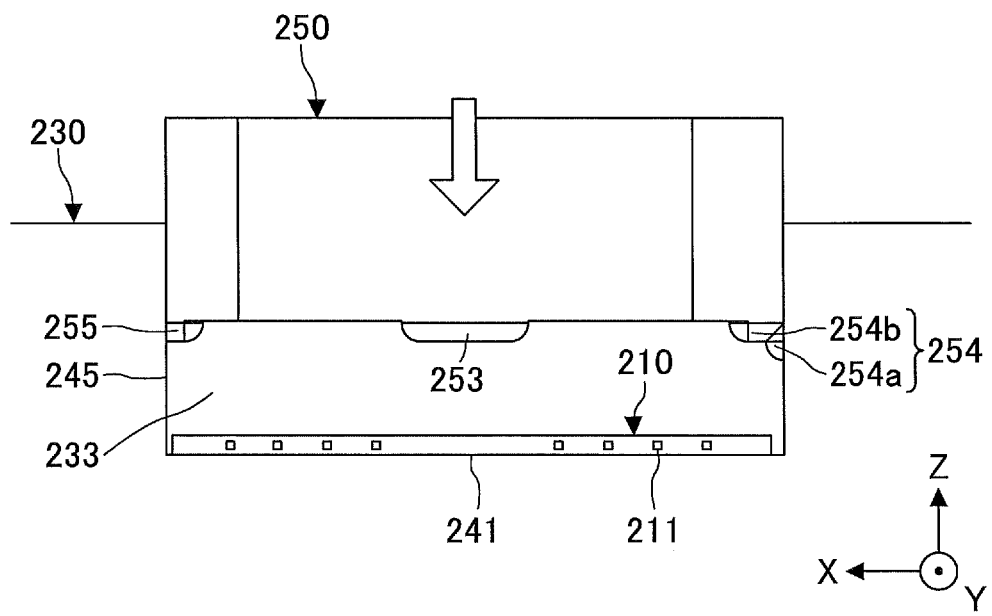
FIGS. 12A and 12B are schematic diagrams for describing the positioning of an optical waveguide of the second embodiment.
Figure 12B:
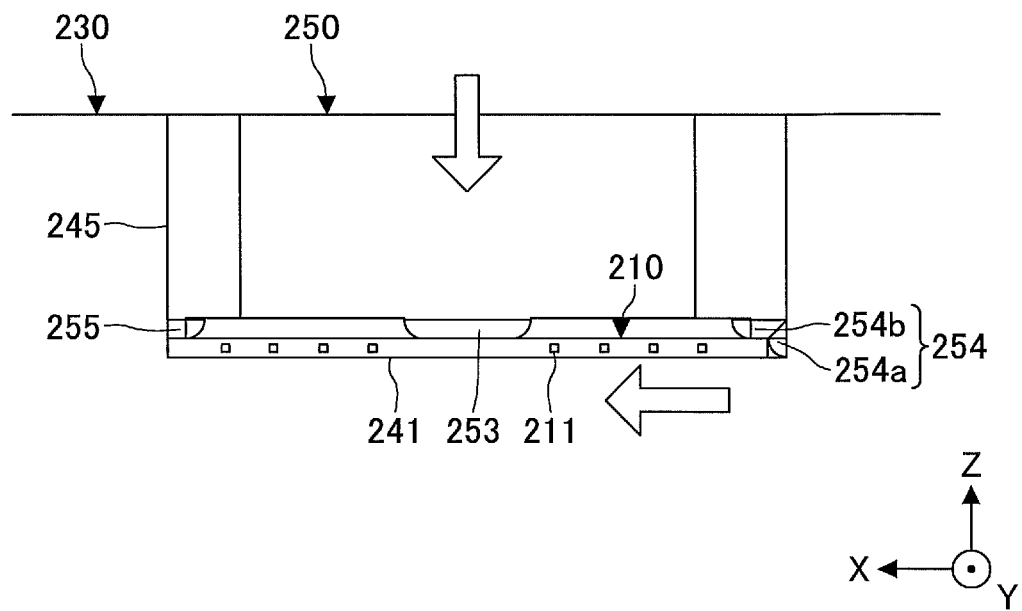

FIGS. 12A and 12B are schematic diagrams for describing the positioning of the optical waveguide 210 of the second embodiment.

As illustrated in FIG. 12A, the optical waveguide 210 including multiple cores 211 arranged in the X-direction is set on the first reference surface 241 in a manner that a distal end of the optical waveguide 210 abuts a distal end reference surface 243 (not illustrated in FIGS. 6A and 6B) of the connector body 230. Further, the optical waveguide 210 is guided by the inclined surface 247 of the connector body 230 and is moved toward the second reference surface 245 when inserting the optical waveguide 210 into the connector body 230. The positioning member 250 is inserted into the opening 233 of the connector body 230 in the state where the optical waveguide 210 is set in the connector body 230.

When the positioning member 250 is inserted into the opening 233 of the connector body 230 as illustrated in FIG. 12A, the guide 254a of the positioning part 254 contacts the width direction end of the optical waveguide 210 (right end in FIG. 12A). When the positioning member 250 is inserted further into the opening 233 in the state where the guide 254a is contacting the optical waveguide 210, the inclined inner surface of the guide 254a presses the optical waveguide 210 and causes the optical waveguide 210 to move the optical waveguide 210 the width direction (leftward in FIG. 12A).

As illustrated in FIG. 12B, when the positioning member 250 is inserted completely into the opening 233 of the connector body 230, the upper surface of the optical waveguide 241 is pressed toward the first reference surface 241 by the center pressing part 253, the side pressing part 255, and the pressing part 254b, so that the position of the optical waveguide 210 is defined with respect to the height direction.

Further, because the width direction ends of the optical waveguide 210 are fixed by contacting the second reference surface 245 and the guide 254a, the position of the optical waveguide 210 is defined with respect to the width direction.

By defining the positions of the optical waveguide 210 with respect to the height direction and the width direction, the end surfaces of the multiple cores 211 are provided facing corresponding lenses of the lens array 231 of the connector body 230.

With the optical connector 200 of the second embodiment, the position of the optical waveguide 210 can be defined by engaging the positioning member 250 to the opening 233 of the connector body 230. Further, high accuracy alignment between the multiple cores 211 and the lens array 231 can be achieved with a simple configuration.

Third Embodiment

Next, a third embodiment of the present invention is described with reference to the accompanying drawings. In the third embodiment, like components/parts are denoted with like reference numerals as the reference numerals of the first and second embodiments and are not further explained.

(Optical Connector)

Figure 13:
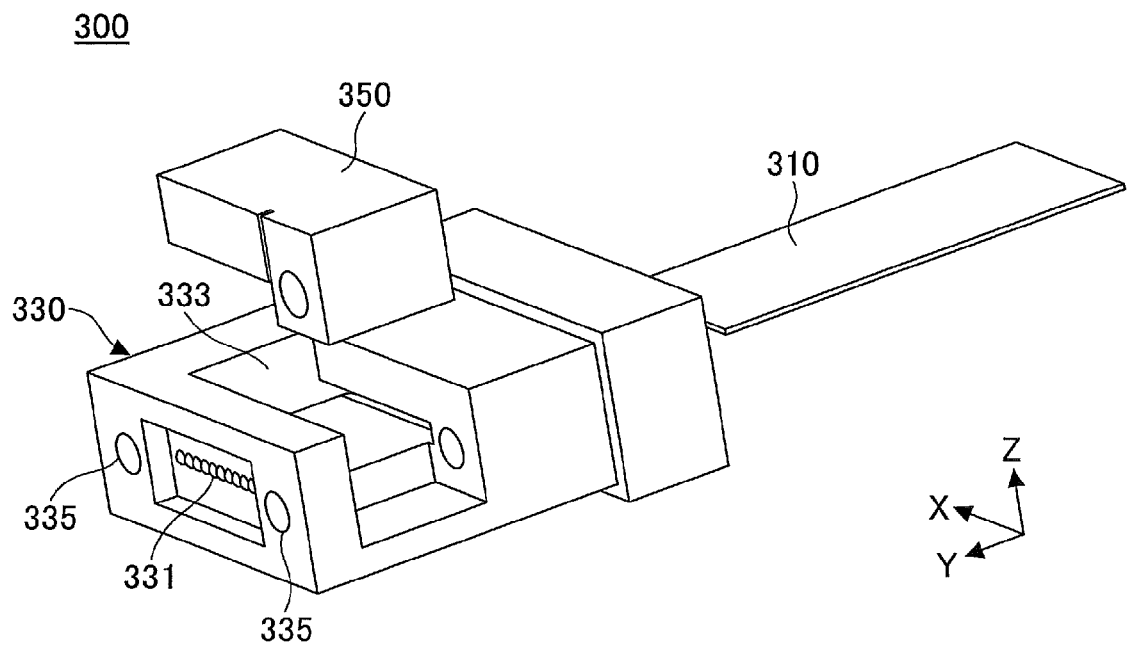
FIG. 13 is a schematic diagram illustrating a configuration of an optical connector according to a third embodiment of the present invention.

FIG. 13 is a schematic diagram illustrating a configuration of an optical connector 300 according to the third embodiment. As illustrated in FIG. 13, the optical connector 300 includes an optical waveguide 310, a connector body 330, and a cover 350 serving as a positioning member.

Similar to the optical waveguide of the above-described embodiments, the optical waveguide 310 has a flat film-like shape. Multiple cores 311 that propagate light are arranged inside the optical waveguide 310.

The connector body 330 includes a lens array 331, an opening 333, and a connection pin hole 335. The connector body 330 is molded by using a resin that is transparent with respect to a propagated light. The lens array 331 has multiple lenses arranged, so that each lens is provided in a manner facing an end of a corresponding core 311 of the optical waveguide 310. The opening 333 is provided on the side of an upper surface of the connector body 330 and has the cover 350 mounted thereto. The position of the optical waveguide 310 to be set in the connector body 330 is defined by mounting the cover 350 to the opening 333. Thereby, multiple cores 311 are provided in a manner facing the lens array 331 of the connector body 330.

(Connector Body)

Figure 14A:
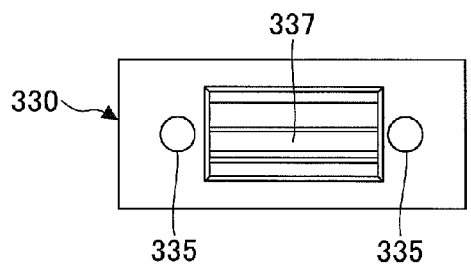
FIGS. 14A-14D are schematic diagrams illustrating configurations of a connector body of the third embodiment.
Figure 14B:
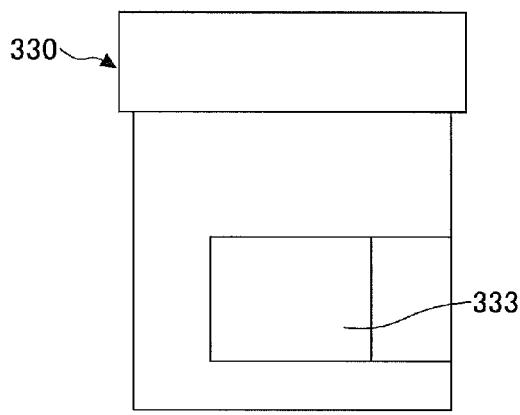
Figure 14C:
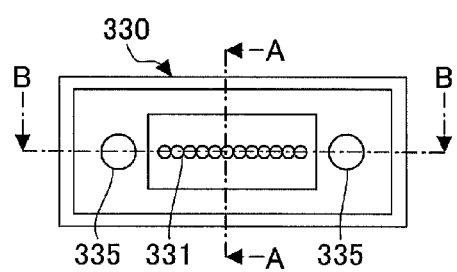
Figure 14D:
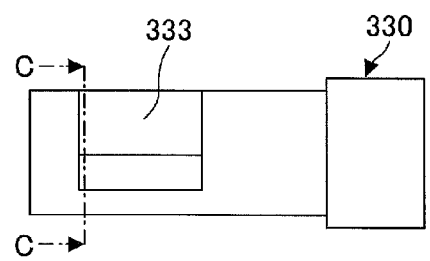

FIGS. 14A-14D are schematic diagrams illustrating configurations of the connector body 330 of the third embodiment. FIG. 14A is a rear view of the connector body 330, FIG. 14B is a plan view of the connector body 330, FIG. 14C is a front view of the connector body 330, and FIG. 14D is a side view of the connector body 330.

As illustrated in FIG. 14B and 14D, the opening 333 extending from the upper surface to the side surface of the connector body 330 is provided on the connector body 330. The lens array 331 is provided on the front surface of the connector body 330 as illustrated in FIG. 14C. Two connection pin holes 335 are provided one on each side of the connector body 330 in a manner that the lens array 331 is provided therebetween. The connection pin holes 335 are provided to extend in parallel from the front surface of the connector body 330 in the depth direction of the connector body 330. One of the connection pin holes 335 having the opening 333 therebetween (right side in FIG. 14C) is formed at the front and rear in the depth direction to be coupled to a coupling hole 357 of the cover 350 covering the opening 333.

As illustrated in FIG. 14A, an insertion hole 337 into which the optical waveguide 310 is inserted is provided on the rear surface of the connector body 330.

Figure 15A:
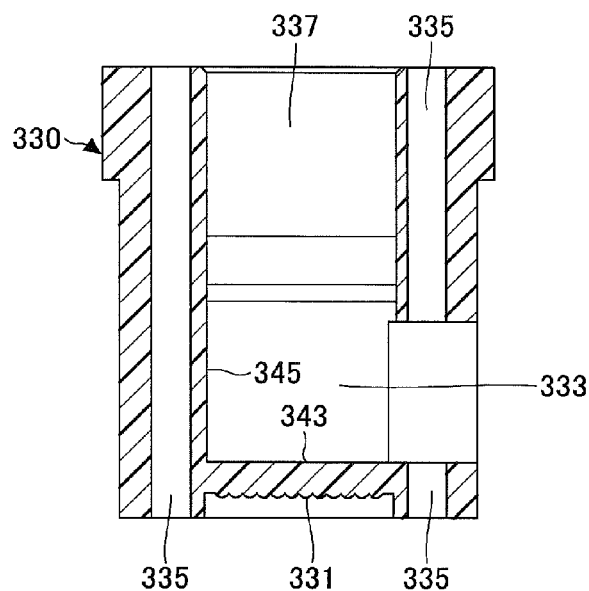
FIGS. 15A-15C are cross-sectional views illustrating configurations of the connector body of the third embodiment.
Figure 15B:
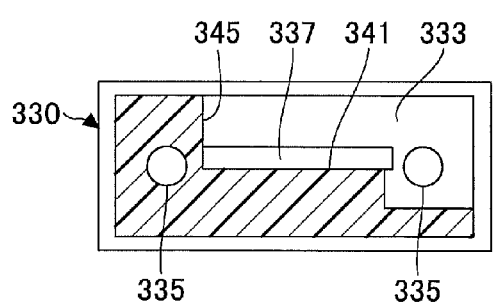
Figure 15C:
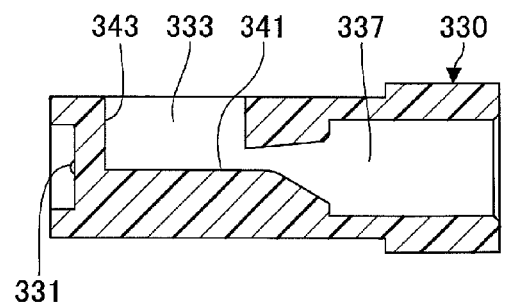

FIGS. 15A-15C are cross-sectional views illustrating configurations of the connector body 330 of the third embodiment. FIG. 15A is a cross-sectional view of the connector body 330 taken along line B-B of FIG. 14C. FIG. 15B is a cross-sectional view of the connector body 330 taken along line C-C of FIG. 14D. FIG. 15C is a cross-sectional view of the connector body 330 taken along line A-A of FIG. 14C.

The connector body 330 includes a space that communicates with the opening 333 and the insertion hole 337. The optical waveguide 310 is to be set inside this space. As illustrated in FIGS. 15B and 15C, the connector body 330 includes a first reference surface 341 that comes in contact with the bottom surface of the optical waveguide 310 for defining the position of the optical waveguide 310 with respect to the height direction in a manner that the end surface of the core 311 faces the lens array 331. The connector body 330 also includes a distal end reference surface 343 as illustrated in FIGS. 15A and 15C that comes into contact with the distal end of the optical waveguide, for defining the position of the optical waveguide 310 with respect to the depth direction. The connector body 330 also includes a second reference surface 345 as illustrated in FIGS. 15A and 15B that comes into contact with the width direction end of the optical waveguide, for defining the position of the optical waveguide 310 with respect to the width direction.

The optical waveguide 310 is inserted into the connector body 330 from the insertion hole 337 and is set in the connector body 330 in a manner having its distal end contacting the distal end reference surface 343 and its lower surface contacting the first reference surface 341.

(Cover)

FIGS. 16A-16F are schematic diagrams illustrating configurations of the cover 350 of the third embodiment. FIG. 16A is a rear view of the cover 350. FIG. 16B is a plan view of the cover 350. FIG. 16C is a left side view of the cover 350. FIG. 16D is a front view of the cover 350. FIG. 16E is a right side view of the cover 350. FIG. 16F is a bottom view of the cover 350.

As illustrated in FIGS. 16A-16F, the cover 350 includes an upper surface cover 353 covering the opening 333 on the upper surface of the connector body 330 and a side surface cover 355 covering the opening 333 on the side surface of the connector body 330. The cover 350 is mounted to the connector body 330 in a manner covering the opening 333.

The cover 350 also includes an air-vent groove 351. In a state where the cover 350 is mounted to the opening 333 of the connector body 330, the air-vent groove 351 and the sidewall of the opening 333 form a gap that leads from an installation space of the optical waveguide 310 to the outside of the connector body 330 as illustrated in FIGS. 16B, 16D, and 16F.

The cover 350 also includes the coupling hole 357 for coupling with the connection pin hole 335 of the connector body 330. Instead of the coupling hole 357, the cover 350 may include, for example, a space such as a recess through which the connection pin is inserted.

When the cover 350 is mounted to the opening 333 of the connector body 330, a lower surface 354 of the upper surface cover 353 contacts the upper surface of the optical waveguide 310 and presses the optical waveguide 310 to the first reference surface 341 of the connector body 330. The bottom surface of the optical waveguide contacts with the first reference surface when the upper surface of the optical waveguide is pressed, and the position of the optical waveguide 310 is defined with respect to the height direction.

When the cover 350 is mounted to the connector body 330, an inner surface 356 of the side surface cover 355 contacts a width direction end of the optical waveguide 310. Because the width direction end of the optical waveguide 310 contacts the inner surface 356 of the side surface cover 355 and the second reference surface 345 of the connector body 330, the position of the optical waveguide 310 is defined with respect to the width direction.

A tapered surface is provided on the lower surface 354 of the upper surface cover 353 on the side of the connector body 330 facing the insertion hole 337 as illustrated in FIGS. 16A, 16C, and 16F.

Further, fine-sized irregularities may be formed on the lower surface 354 of the upper surface cover 353 and the inner side surface 356 of the side surface cover 355. Adhesive applied between the cover and the connector body or the optical waveguide spread throughout a space between the cover and the optical waveguide or the connector body by a capillary phenomenon caused by the fine-sized irregularities, and the bond between the cover 350 and the connector body 330 or the optical waveguide 310 can be strengthened.

(Positioning of Optical Waveguide)

Figure 17A:
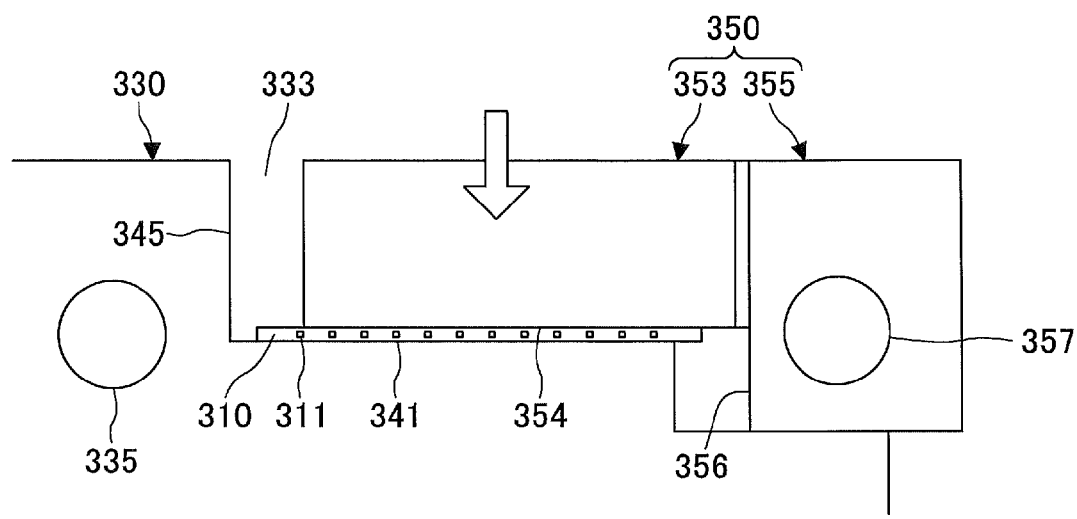
FIGS. 17A and 17B are schematic diagrams for describing the positioning of an optical waveguide of the third embodiment.
Figure 17B:
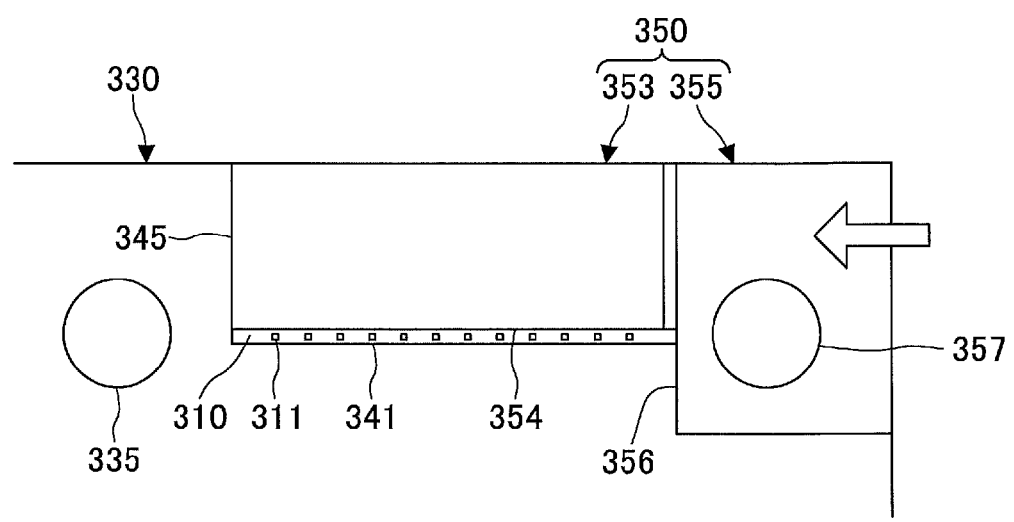

FIGS. 17A and 17B are schematic diagrams for describing the positioning of the optical waveguide 310 of the third embodiment.

As illustrated in FIG. 17A, the optical waveguide 310 with multiple cores 311 is set on the first reference surface 341 in a manner that a distal end of the optical waveguide 310 abuts a distal end reference surface 343 (not illustrated in FIGS. 17A and 17B) of the connector body 330. Then, the cover 350 is mounted to the opening 333 of the connector body 330 from the upper side of the optical waveguide 310 in a state where the optical waveguide 310 is set in the connector body 330.

When mounting the cover 350 to the opening 333 of the connector body 330 as illustrated in FIG. 17A, the lower surface 354 of the upper surface cover 353 contacts the upper surface of the optical waveguide 310, so that the optical waveguide is pushed toward the first reference surface, and the bottom surface of the side surface cover 355 contacts with the opening 333 of the connector body 330. The cover 350 is mounted to the opening 333 of the connector body 330 in this manner, and the bottom surface of the side surface cover 355 pushes the optical waveguide 310 toward the first reference surface 341 in the arrow direction of FIG. 17A.

Then, as illustrated in FIG. 17B, the cover 350 is moved across the opening 333 of the connector body 330 in the width direction of the connector body 330 (leftward in FIG. 17B) from the state illustrated in FIG. 17A. When the cover 350 is moved in the leftward direction in FIG. 17B, the inner surface 356 of the side surface cover 355 contacts a width direction end of the optical waveguide 310 (right end in FIG. 17B). When the cover 350 is moved further in the leftward direction in FIG. 17B, the inner surface 356 of the side surface cover 355 presses the optical waveguide 310 and causes the optical waveguide 310 to move toward the second reference surface 345.

By exerting pressure from the side surface cover 355 of the cover 350 to the optical waveguide 310, the width direction end of the optical waveguide 310 (left end in FIG. 17B) contacts the second reference surface 345 of the connector body 330. Owing to the contact between the width direction ends of the optical waveguide 310 and the inner surface 356 of the side surface cover 355 and the second reference surface 345, the position of the optical waveguide 310 is defined with respect to the width direction.

When the cover 350 is mounted to the opening 333 of the connector body 330 in a manner described above, the upper surface of the optical waveguide is pressed toward the first reference surface 341 by the lower surface 354 of the upper surface cover 353, and the position of the optical waveguide 310 is defined with respect to the height direction. Further, the optical waveguide 310 is fixed in place by having the width direction ends contact the second reference surface 345 and the inner surface 356 of the side surface cover 355, respectively. Thereby, the position of the optical waveguide 310 is defined with respect to the width direction.

By defining the positions of the optical waveguide 310 with respect to the height direction and the width direction by using the cover 350, the end surfaces of the multiple cores 311 are provided facing corresponding lenses of the lens array 331 of the connector body 330.

With the optical connector 300 of the third embodiment, the position of the optical waveguide 310 can be defined by mounting the cover 350 to the opening 333 of the connector body 330 while moving the cover 350 downward and leftward as illustrated in FIGS. 17A and 17B. Further, high accuracy alignment between the multiple cores 311 and the lens array 331 can be achieved with a simple configuration.

Fourth Embodiment

Next, a fourth embodiment of the present invention is described with reference to the accompanying drawings. In the fourth embodiment, like components/parts are denoted with like reference numerals as the reference numerals of the first-third embodiments and are not further explained.
(Optical Connector)

Figure 18:
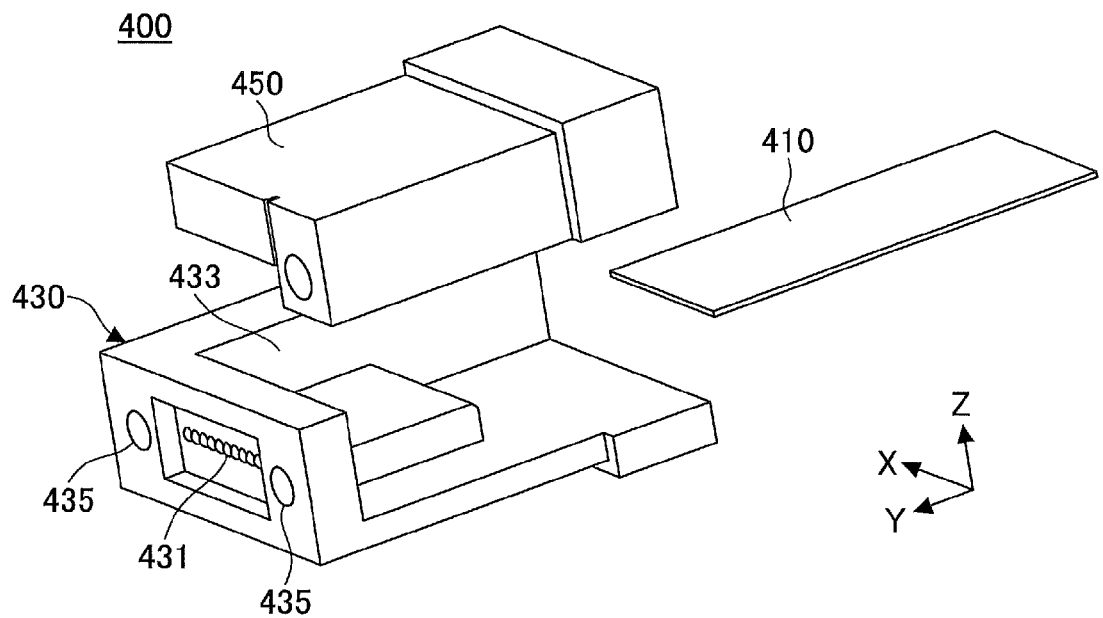
FIG. 18 is a schematic diagram illustrating a configuration of an optical connector according to a fourth embodiment of the present invention.

FIG. 18 is a schematic diagram illustrating a configuration of an optical connector 400 according to the fourth embodiment. As illustrated in FIG. 18, the optical connector 400 includes an optical waveguide 410, a connector body 430, and a cover 450 serving as a positioning member.

The optical waveguide 410 has a flat film-like shape. Multiple cores 411 that propagate light are arranged in the X-direction inside the optical waveguide 410.

The connector body 430 includes a lens array 431, an opening 433, and a connection pin hole 435. The connector body 430 is molded by using a resin that is transparent with respect to a propagated light. The lens array 431 has multiple lenses arranged in the X direction. Each lens is provided in a manner facing an end of a corresponding core 411 of the optical waveguide 410 to be set in the connector body 430. The opening 433 is provided on an upper surface of the connector body 430 and the cover 450 is mounted thereto. The position of the optical waveguide 410 to be set in the connector body 430 is defined by mounting the cover 450 to the opening 433. Thereby, multiple cores 411 are provided in a manner facing the lens array 431 of the connector body 430.
(Connector Body)

Figure 19A:
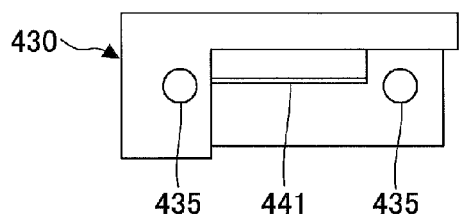
FIGS. 19A-19D are schematic diagrams illustrating configurations of a connector body of the fourth embodiment.
Figure 19B:
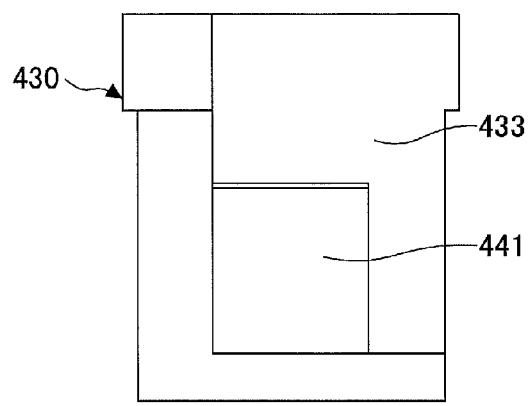
Figure 19C:
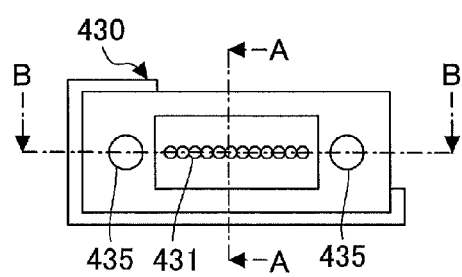
Figure 19D:
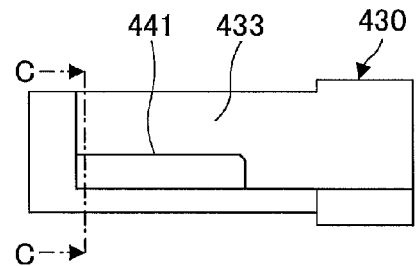

FIGS. 19A-19D are schematic diagrams illustrating configurations of the connector body 430 of the fourth embodiment. FIG. 19A is a rear view of the connector body 430, FIG. 19B is a plan view of the connector body 430, FIG. 19C is a front view of the connector body 430, and FIG. 19D is a side view of the connector body 430.

As illustrated in FIG. 19B and 19D, the opening 433 extending from the upper surface to the side surface of the connector body 430 is provided on the connector body 430. The lens array 431 is provided on the front surface of the connector body 430 as illustrated in FIG. 19C. Connection pin holes 435 are provided on the front surface of the connector body 430.

The cover 450 is mounted to the opening 433 in a state where the optical waveguide 410 is set on the first reference surface 441 of the connector body 430 as illustrated in FIGS. 19A, 19B, and 19D. A tapered surface is provided on an end of the first reference surface 441 opposite from the side of the lens array 431.

Figure 20A:
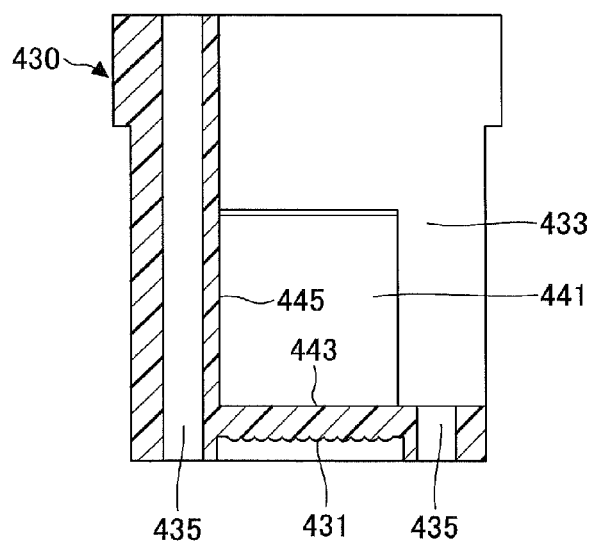
FIGS. 20A-20C are cross-sectional views illustrating configurations of the connector body of the fourth embodiment.
Figure 20B:
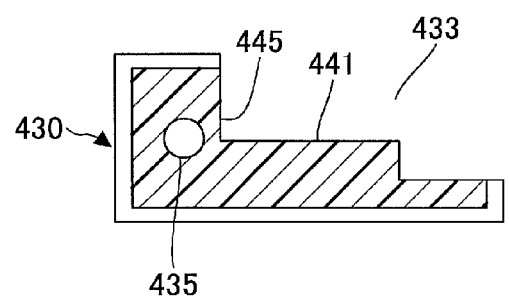
Figure 20C:
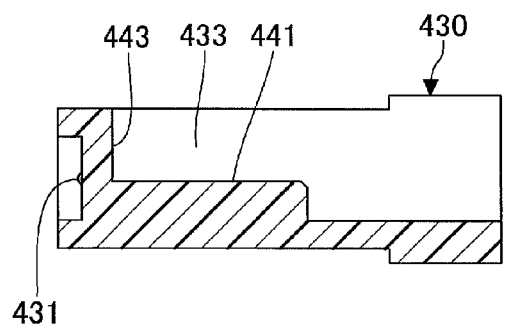

FIGS. 20A-20C are cross-sectional views illustrating configurations of the connector body 430 of the fourth embodiment. FIG. 20A is a cross-sectional view of the connector body 430 taken along line B-B of FIG. 19C. FIG. 20B is a cross-sectional view of the connector body 430 taken along line C-C of FIG. 19D. FIG. 20C is a cross-sectional view of the connector body 430 taken along line A-A of FIG. 19C.

The connector body 430 includes a first reference surface 441 that comes in contact with the bottom surface of the optical waveguide, for defining the position of the optical waveguide 410 with respect to the height direction in a manner that the end surface of the core 411 faces the lens array 431. The connector body 430 also includes a distal end reference surface 443 as illustrated in FIGS. 20A and 20C that comes in contact with the distal end of the optical waveguide, for defining the position of the optical waveguide 410 with respect to the depth direction. The connector body 430 also includes a second reference surface 445 that contacts the width direction end of the optical waveguide 410 and defines the position of the optical waveguide 410 with respect to the width direction.

The optical waveguide 410 is set in the connector body 430 in a manner having its distal end contacting the distal end reference surface 443 and its lower surface contacting the first reference surface 441.

Two connection pin holes 435 are provided one on each side of the connector body 430 in a manner that the lens array 431 is provided therebetween.
(Cover)

FIGS. 21A-21F are schematic diagrams illustrating configurations of the cover 450 of the fourth embodiment. FIG. 21A is a rear view of the cover 450. FIG. 21B is a plan view of the cover 450. FIG. 21C is a left side view of the cover 450. FIG. 21D is a front view of the cover 450. FIG. 21E is a right side view of the cover 450. FIG. 21F is a bottom view of the cover 450.

As illustrated in FIGS. 21A-21F, the cover 450 includes an upper surface cover 453 covering the opening 433 on the upper surface of the connector body 430 and a side surface cover 455 covering the opening 433 on the side surface of the connector body 430. The cover 450 is mounted to the connector body 430 in a manner covering the opening 433.

The cover 450 also includes an air-vent groove 451. When the cover 450 is mounted to the opening 433 of the connector body 430, the air-vent groove 451 and the sidewall of the opening 433 form a gap that leads from an installation space of the optical waveguide 410 to the outside of the connector body 430 as illustrated in FIGS. 21B, 21D, and 21F.

The cover 450 also includes the coupling hole 457 for coupling with the connection pin hole 435 of the connector body 430. Instead of the coupling hole 457, the cover 450 may include, for example, a space such as a recess through which the connection pin is inserted.

When the cover 450 is mounted to the opening 433 of the connector body 430, a lower surface 454 of the upper surface cover 453 contacts the upper surface of the optical waveguide 410 and presses the optical waveguide 410 to the first reference surface 441 of the connector body 430. The lower surface of the optical waveguide contacts with the first reference surface when its upper surface is pushed, and position of the optical waveguide 410 is defined with respect to the height direction.

In a state where the cover 450 is mounted to the connector body 430, an inner surface 456 of the side surface cover 455 contacts a width direction end of the optical waveguide 410. Because the width direction end of the optical waveguide 410 contacts the inner surface 456 of the side surface cover 455 and the second reference surface 445 of the connector body 430, the position of the optical waveguide 410 is defined with respect to the width direction.

A tapered surface is provided on the lower surface 454 of the upper surface cover 453 on the side of the coupling hole 457 is provided as illustrated in FIGS. 21D and 21F.

Further, fine-sized irregularities may be formed on the lower surface 454 of the upper surface cover 453 and the inner surface 456 of the side surface cover 455. Adhesive applied between the cover and the optical waveguide or the connector body spread throughout the space between the cover and the optical waveguide or the cover connector body by a capillary phenomenon caused by the fine-sized irregularities, and the cover is strongly bonded to the connector body 430 and the optical waveguide 410.

(Positioning of Optical Waveguide)

Figure 22A:
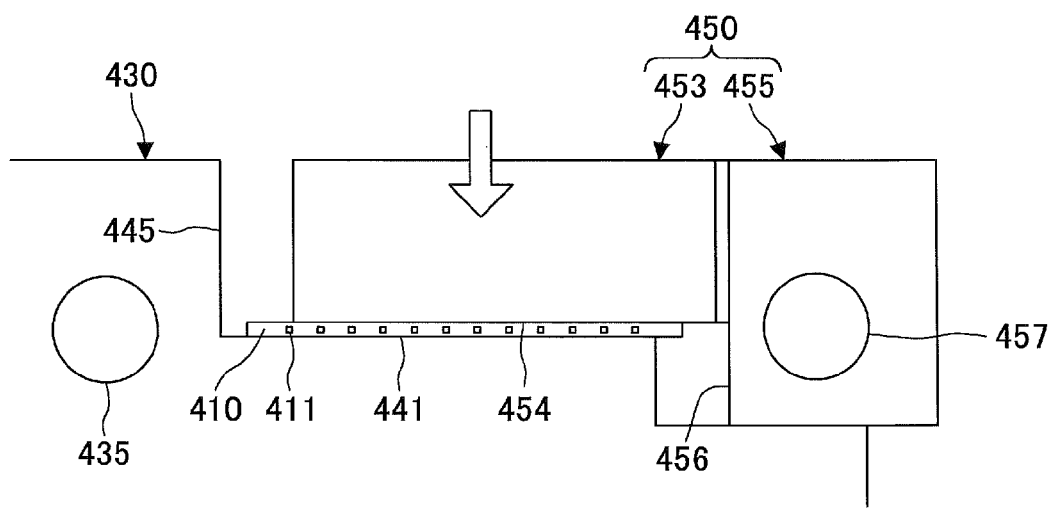
FIGS. 22A and 22B are schematic diagrams for describing the positioning of an optical waveguide of the fourth embodiment.
Figure 22B:
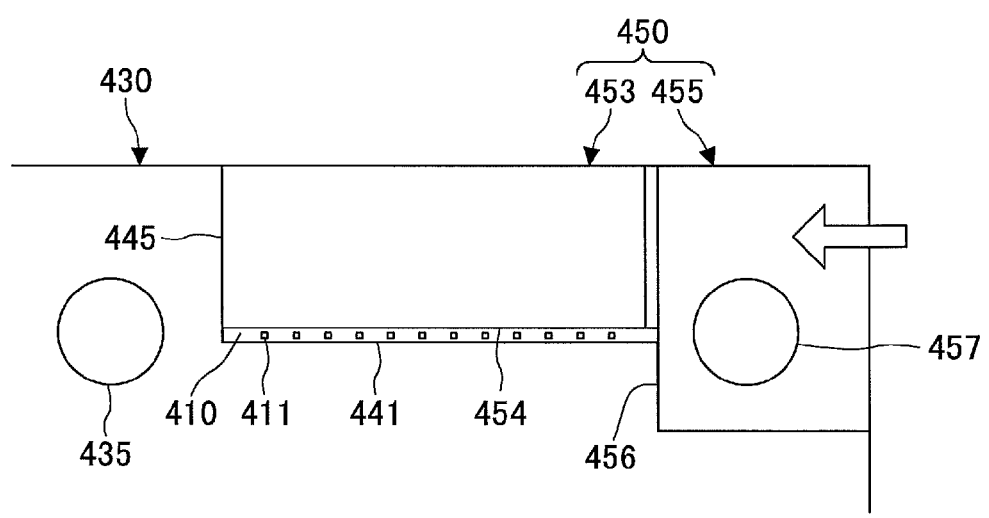

FIGS. 22A and 22B are schematic diagrams for describing the positioning of the optical waveguide 410 of the fourth embodiment.

As illustrated in FIG. 22A, the optical waveguide 410 with multiple cores 411 is set on the first reference surface 441 in a manner that a distal end of the optical waveguide 410 abuts a distal end reference surface 443 (not illustrated in FIGS. 21A and 21B) of the connector body 430. In this state where the optical waveguide 410 is set in the connector body 430, the cover 450 is mounted to the opening 433 of the connector body 430.

When mounting the cover 450 to the opening 433 of the connector body 430 as illustrated in FIG. 22A, the upper surface cover 453 is set in the arrow direction of FIG. 22A. Thereby, the lower surface 454 of the upper surface cover 453 contacts the upper surface of the optical waveguide 410 and presses the optical waveguide 410 to the first reference surface 441 of the connector body 430.

Then, as illustrated in FIG. 22B, the cover 450 is moved across the opening 433 of the connector body 430 in the width direction (leftward in FIG. 22B) from the state illustrated in FIG. 22A. When the cover 450 is moved in the leftward direction, the inner surface 456 of the side surface cover 455 contacts a width direction end of the optical waveguide 410 (right end in FIG. 22B) and pushes the optical waveguide 410, so that the optical waveguide 410 is moved leftward in FIG. 22B.

When the cover 450 is mounted to the opening 433 of the connector body 430 in a manner described above, the upper surface of the optical waveguide is pressed toward the first reference surface 441 by the lower surface 454 of the upper surface cover 453, and the position of the optical waveguide 410 is defined with respect to the height direction. By having the width direction ends of the optical waveguide 410 contact the second reference surface 445 and the inner surface 456 of the side surface cover 455, the position of the optical waveguide 410 is defined with respect to the width direction.

By defining the positions of the optical waveguide 410 with respect to the height direction and the width direction by using the cover 450, the end surfaces of the multiple cores 411 are provided facing corresponding lenses of the lens array 431 of the connector body 430.

With the optical connector 400 of the fourth embodiment, the position of the optical waveguide 410 can be defined by mounting the cover 450 to the opening 433 of the connector body 430. Further, high accuracy alignment between the multiple cores 411 and the lens array 431 can be achieved with a simple configuration.

Fifth Embodiment

Next, a fifth embodiment of the present invention is described with reference to the accompanying drawings. In the fifth embodiment, like components/parts are denoted with like reference numerals as the reference numerals of the first-fourth embodiments and are not further explained.

(Optical Connector)

Figure 23:
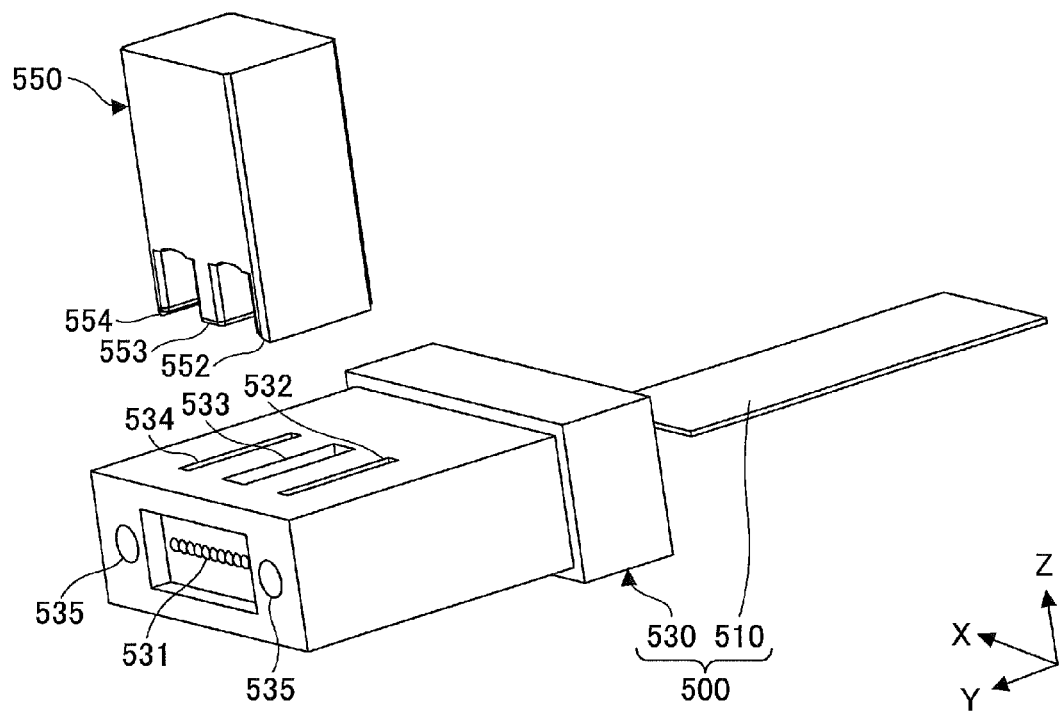
FIG. 23 is a schematic diagram illustrating configurations of an optical connector and a jig according to a fifth embodiment of the present invention.

FIG. 23 is a schematic diagram illustrating a configuration of an optical connector 500 and a jig 550 according to the fifth embodiment. As illustrated in FIG. 23, the optical connector 500 includes an optical waveguide 510 and a connector body 530. The jig 550 defines the position of the optical waveguide 510 in the connector body 530.

The optical waveguide 510 has a flat film-like shape. Multiple cores 511 that propagate light are arranged inside the optical waveguide 510.

The connector body 530 includes a lens array 531, a first opening 532, a second opening 533, a third opening 534, and a connection pin hole 535. The connector body 530 is molded by using a resin that is transparent with respect to a propagated light. The lens array 531 has multiple lenses arranged in the X direction. Each lens is provided in a manner facing an end of a corresponding core 511 of the optical waveguide 510 to be set in the connector body 530.

The first opening 532, the second opening 533, and the third opening 534 are slit-like openings of the connector body 530 that are elongated in the depth direction and lead to an installation space of the optical waveguide 510. The first opening 532, the second opening 533, and the third opening 534 are provided on an upper surface of the connector body 530. The position of the optical waveguide 510 to be inserted into the connector body 530 is defined by the jig 550 in a manner that the multiple cores 511 of the optical waveguide 510 face the lens array 531 of the connector body 530.

The jig 550 includes a first positioning part 552, a center pressing part 553, and a second positioning part 554 that protrude downward. The first positioning part 552, the center pressing part 553, and the second positioning part 554 are inserted in a first opening 532, a second opening 533, and a third opening 534, respectively, and define the position of the optical waveguide 510 set in the connector body 530 with respect to the height direction and width direction.

(Connector Body)

Figure 24A:
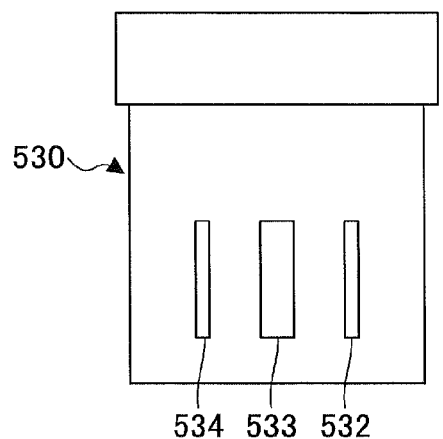
FIGS. 24A-24E are schematic diagrams illustrating configurations of a connector body of the fifth embodiment.
Figure 24B:
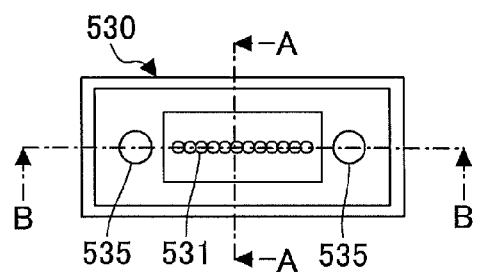
Figure 24C:
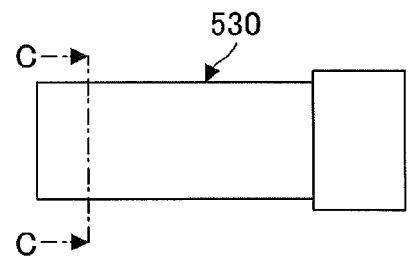
Figure 24D:
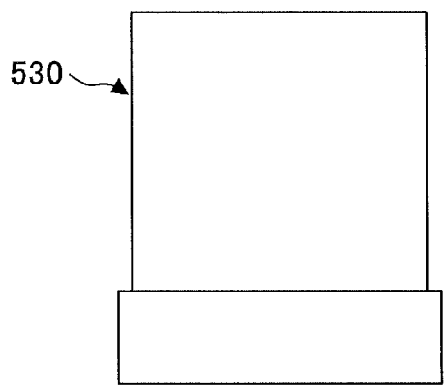
Figure 24E:
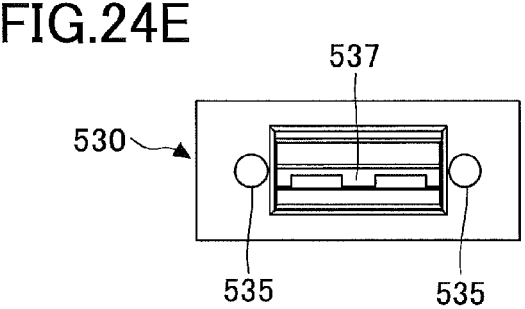

FIGS. 24A-24E are schematic diagrams illustrating the connector body 530 of the fifth embodiment. FIG. 24A is a plan view of the connector body 530, FIG. 24B is a front view of the connector body 530, FIG. 24C is a side view of the connector body 530, FIG. 24D is a bottom view of the connector body 530, and FIG. 24E is a rear view of the connector body 530.

The first opening 532, the second opening 533, and the third opening 534 are provided on the upper surface of the connector body 530 as illustrated in FIG. 24A. The lens array 531 is provided on the front surface of the connector body 530 as illustrated in FIG. 24B. The connection pin holes 535 are provided on the front surface of the connector body 530 having the lens array 531 therebetween. The insertion hole 537 into which the optical waveguide 510 is inserted is provided on the rear surface of the connector body 530 as illustrated in FIG. 24E.

Figure 25A:
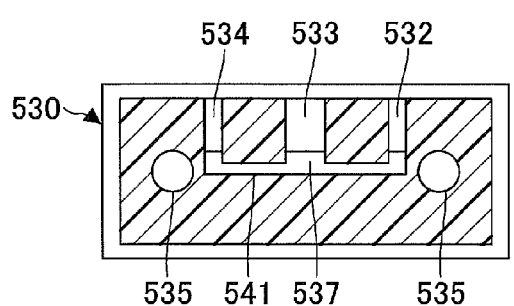
FIGS. 25A-25C are cross-sectional views illustrating configurations of the connector body of the fifth embodiment.
Figure 25B:
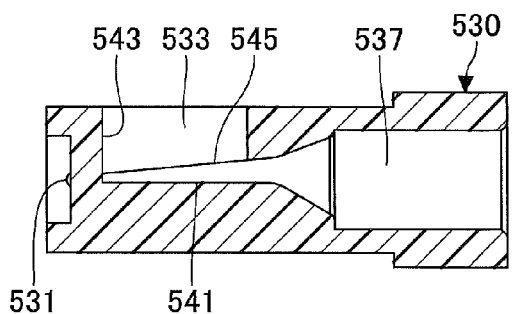
Figure 25C:
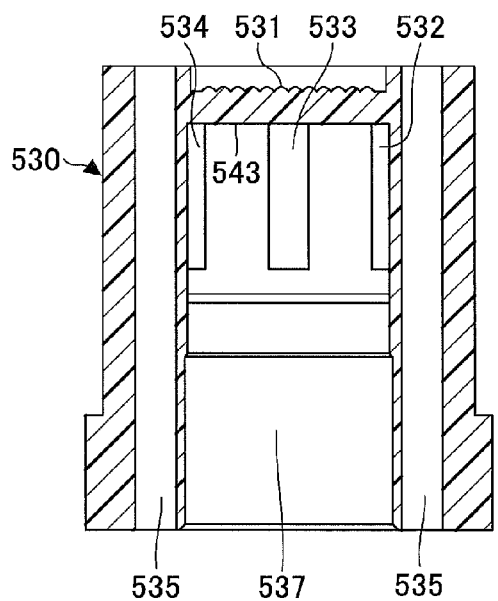

FIGS. 25A-25C are cross-sectional views illustrating configurations of the connector body 530 of the fifth embodiment. FIG. 25A is a cross-sectional view taken along line C-C of FIG. 24C. FIG. 25B is a cross-sectional view taken along line A-A of FIG. 24B. FIG. 25C is a cross-sectional view taken along line B-B of FIG. 24B.

A space for coupling with the first opening 532, the second opening 533, and the third opening 534 with respect to the insertion hole 537 is formed inside the connector body 530. The optical waveguide 510 is installed in the connector body 530 by being inserted into the space. As illustrated in FIG. 25A and 25B, the connector body 530 includes a reference surface 541 that comes into contact with the lower surface of the optical waveguide 510, and defines the position of the optical waveguide 510 with respect to the height direction in a manner that the end surface of the core 511 of the optical waveguide 510 faces the lens array 531.

As illustrated in FIG. 25B, the connector body 530 includes an inclined surface 545 that faces the reference surface 541 and narrows the space between the reference surface 541 toward the lens array 531. The optical waveguide 510 is inserted from the insertion hole 537 and guided to a position in which a distal end of the optical waveguide 510 passes between the reference surface 541 and the inclined surface 545 and abuts a distal end reference surface 543. By guiding the optical waveguide 510 along the inclined surface 545 when inserting the optical waveguide 510 into the connector body 530, the optical waveguide 510 is provided in a manner that the lower surface of the optical waveguide 510 contacts the reference surface 541 and is positioned in the vicinity of a reference position with respect to the height direction.

As illustrated in FIG. 25B and 25C, the connector body 530 includes the distal end reference surface 543 that contacts the distal end of the optical waveguide 510 and defines the position of the optical waveguide 510 with respect to the depth direction. The optical waveguide 510 inserted from the insertion hole 537 is provided in the connector body 530 in a manner that its distal end contacts the distal end reference surface 543 and its lower surface contacts the reference surface 541.

(Jig)

Figure 26A:
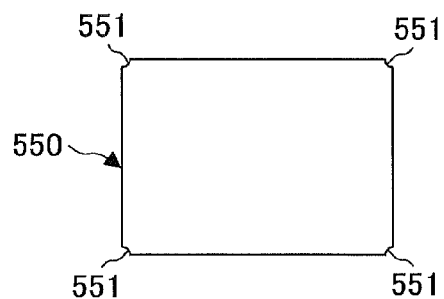
FIGS. 26A-26D are cross-sectional views illustrating configurations of a jig of the fifth embodiment.
Figure 26B:
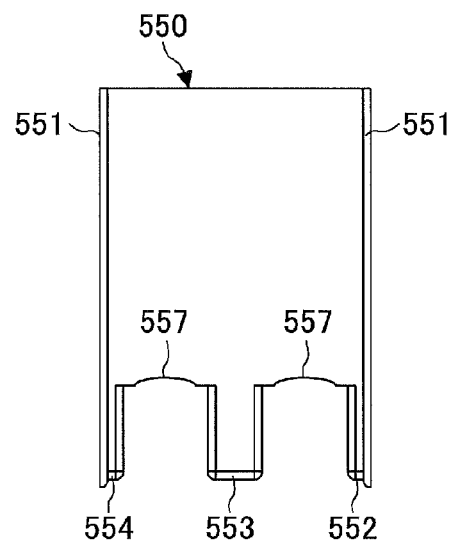
Figure 26C:
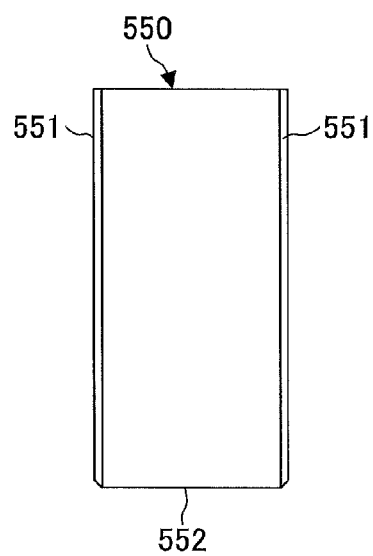
Figure 26D:
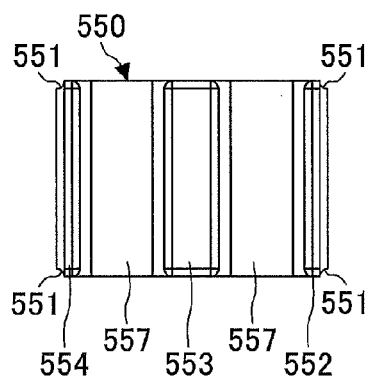

FIGS. 26A-26D are schematic diagrams illustrating the jig 550 of the fifth embodiment. FIG. 26A is a plan view of the jig 550. FIG. 26B is a front view of the jig 550. FIG. 26C is a side view of the jig 550. FIG. 26D is a bottom view of the jig 550.

As illustrated in FIGS. 26B and 26D, the jig 550 includes the first positioning part 552, the center pressing part 553, and the second positioning part 554 that protrude from a lower surface of the jig 550.

When the jig 550 is inserted into the connector body 530, the center pressing part 553 contacts the upper surface of the optical waveguide 510 and presses the optical waveguide 510 toward the reference surface 541 of the connector body 530. By exerting pressure from the center pressing part 533 to the upper surface of the optical waveguide 510, the bottom surface of the optical guide contacts with the reference surface, and the position of the optical waveguide 510 is defined with respect to the height direction.

The center pressing part 553 is preferred to be provided in a part of the jig 550, so that the center pressing part 553 pushes a part of the optical waveguide 510 that the core 511 is not provided therein. The jig 550 may include multiple center pressing parts 553.

Further, fine-sized irregularities may be formed on the lower surface of the center pressing part 553. Adhesive applied between the optical waveguide 510 and the center pressing part 553 spread over the optical waveguide 510 and the center pressing part 553 by a capillary phenomenon caused by the fine-sized irregularities, and the optical waveguide 510 is strongly bonded to the connector body.

When the jig 550 is mounted to the connector body 530, each of the first positioning part 552 and the second positioning part 554 contacts a width direction end of the optical waveguide 510, so that the position of the optical waveguide 510 can be defined with respect to the width direction.

As illustrated in FIG. 26A, the jig 550 includes first air-vent grooves 551 provided on its four corners. When the first positioning parts 552 and the second positioning parts 554 are inserted in corresponding first and third openings 532, 534, the first air-vent grooves 551 and the sidewalls of the first and third openings 532, 534 form a gap that leads from an installation space of the optical waveguide 510 to the outside of the connector body 530. The jig 550 can be easily mounted to the connector body 530 because the air inside the connector body 530 is released outside from the first air-vent grooves 551 when the jig 550 is inserted into the connector body 530.

As illustrated in FIG. 26B, the jig 550 includes second air-vent grooves 557 provided between the first positioning part 552 and the center pressing part 553 and between the center pressing part 553 and the second positioning part 554. The jig 550 can be easily mounted to the connector body 530 because the air inside the connector body 530 is released outside from the second air-vent grooves 557 when the jig 550 is inserted into the connector body 530.

A peripheral part of each of the first positioning part 552, the center pressing part 553, and the second positioning part 554 is chamfered as illustrated in FIGS. 26B and 26D. The chamfered parts of the first positioning part 552, the center pressing part 553 and the second positioning part 554 form gaps between the sidewalls of the first opening 532, the second opening 533, and the third opening 534, respectively. By allowing air to be released outside from the chamfered parts, the jig 550 can be further easily mounted to the connector body 530.

Figure 27:
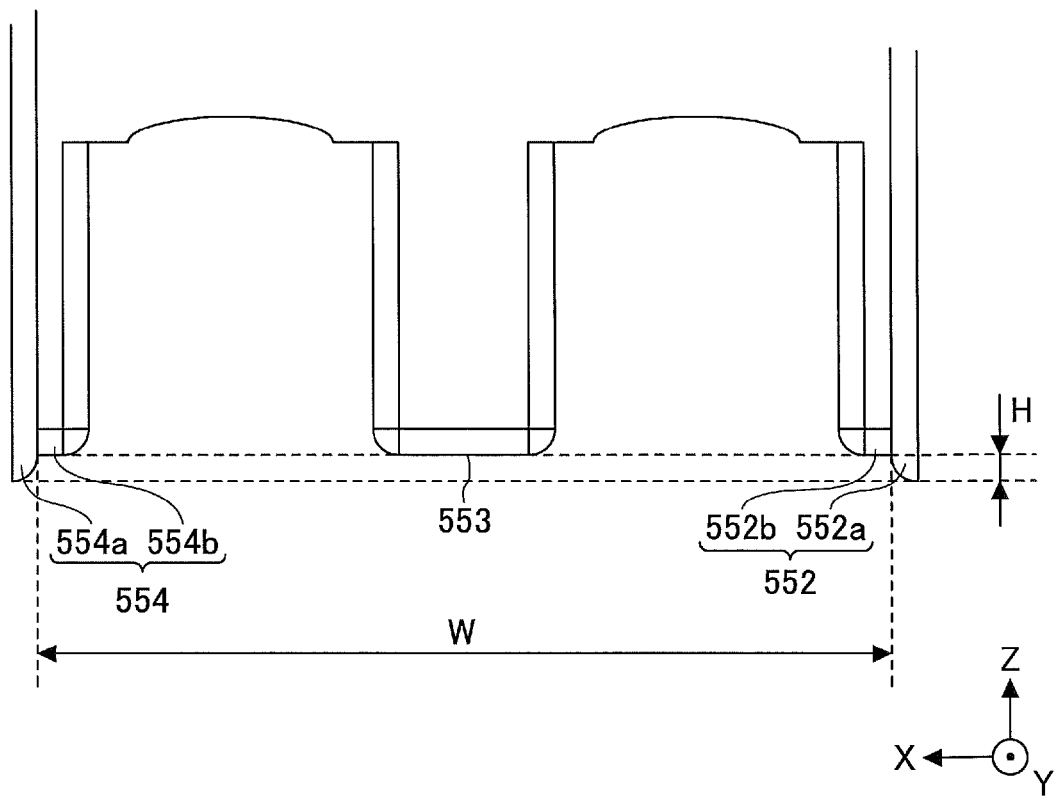
FIG. 27 is an enlarged view of a configuration of the jig of the fifth embodiment.

FIG. 27 is an enlarged view of the jig 550 of the fifth embodiment.

The first positioning part 552 includes a first guide 552a provided on a width direction end of the jig 550 and a first pressing part 552b provided on an inner side (the side toward the center pressing part 553) of the first guide 552a. The first guide 552a includes an inner side surface that is inclined and tapered toward a lower end of the first guide 552a.

The second positioning part 554 includes a second guide 554a provided on a width direction end of the jig 550 and a second pressing part 554b provided on an inner side of the second guide 554a. The second guide 554a includes an inner surface that is inclined and tapered toward a lower end of the second guide 554a.

The interval W between the inner surface of the first guide 552a and the inner side surface of the second guide 554a in the X-direction may be equal to the width of the optical waveguide 510. Further, with respect to the Z-direction, the heights H from the lower surfaces of the center pressing part 553, the first pressing part 552b, and the second pressing part 554b to the lower ends of the first guide 552a and the second guide 554a are equal to the thickness of the optical waveguide 510.

(Positioning of Optical Waveguide)

FIGS. 28A-28D are schematic diagrams for describing the positioning of the optical waveguide 510 of the fifth embodiment.

Figure 28A:
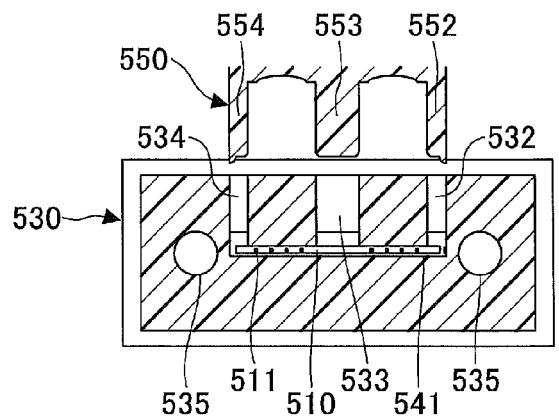
FIGS. 28A-28D are schematic diagrams for describing the positioning of an optical waveguide of the fifth embodiment.

As illustrated in FIG. 28A, the optical waveguide 510 with multiple cores 511 is set on the reference surface 541 in a manner that a distal end of the optical waveguide 510 abuts a distal end reference surface 543 (not illustrated in FIGS. 28A-28D) of the connector body 530. The first positioning part 552, the center pressing part 553, and the second positioning part 554 of the jig 550 are inserted into the first opening 532, the second opening 533, and the third opening 534 of the connector body 530, respectively, in a state where the optical waveguide 510 is set in the connector body 530. In FIG. 28A, the optical waveguide 510 is deviated in the width direction such that the optical waveguide 510 is positioned on a side more toward the first positioning part 552 of the jig 550 (right side in FIGS. 28A).

Figure 28B:
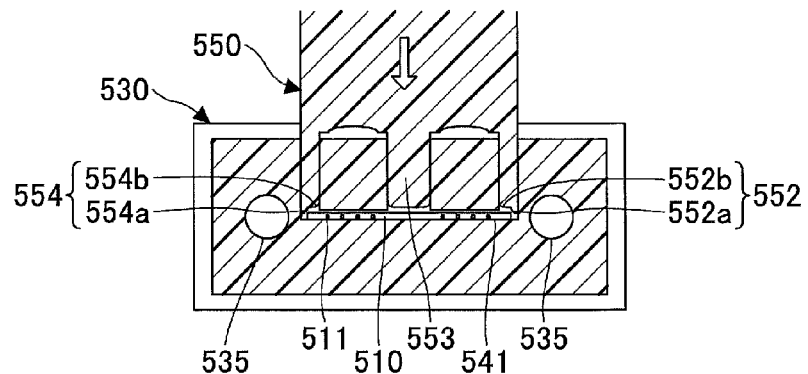

When the jig 550 is inserted into the connector body 530 as illustrated in FIG. 28B, the first guide 552a of the first positioning part 552 contacts the width direction end of the optical waveguide 510 (right end in FIG. 28B). When the jig 550 is further inserted into the connector body 530 in the state where the first guide 552a is contacting the optical waveguide 510, the inclined inner surface of the first guide 552a pushes the optical waveguide 510 and causes the optical waveguide 510 to move leftward in FIG. 28B.

Figure 28C:
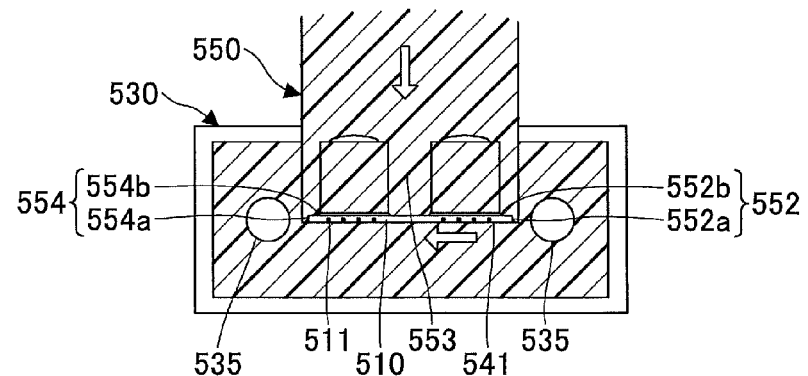

As illustrated in FIG. 28C, when the jig 550 is inserted completely into the connector body 530, the center pressing part 553, the first pressing part 552b, and the second pressing part 554b press the upper surface of the optical waveguide 510 to the reference surface 541, so that the position of the optical waveguide 510 is defined with respect to the height direction. The optical waveguide 510 is pushed in the arrow direction in FIG. 28B by the first guide 552a is fixed in place by having the width direction ends of the optical waveguide 510 contact the first guide 552a and the second guide 554a, respectively. Thereby, the position of the optical waveguide 510 is defined with respect to the width direction of the connector body 530.

Figure 28D:
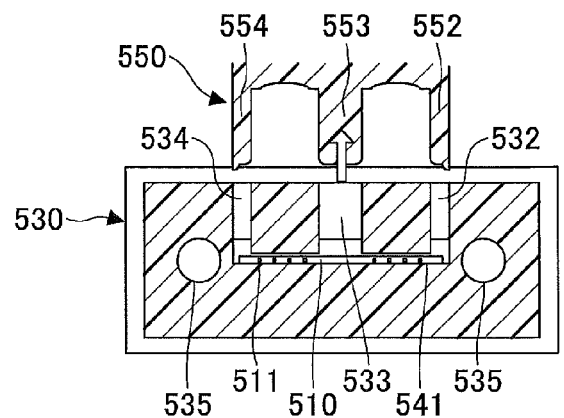

After the position of the optical waveguide 510 is defined, the jig 550 inserted into the connector body 530 is removed from the connector body 530 as illustrated in FIG. 28D. The optical waveguide is fixed to the connector body by using adhesive or the like in a state where the position of the optical waveguide 510 is defined by the jig 550.

Similarly, if the optical waveguide 510 is deviated in the width direction such that the optical waveguide 510 is positioned on a side more toward the second positioning part 554 of the jig 550 (left side in FIGS. 28A), the second guide 554a pushes the optical waveguide 510 and causes the optical waveguide 510 to move rightward in FIG. 28. Thereby, the position of the optical waveguide 510 is defined with respect to the width direction.

FIGS. 29A-29D are schematic diagrams illustrating the positioning of the optical waveguide 510 of the fifth embodiment. FIG. 29A-29D illustrate the positioning of the optical waveguide 510 from a perspective different from FIGS. 28A-28D.

Figure 29A:
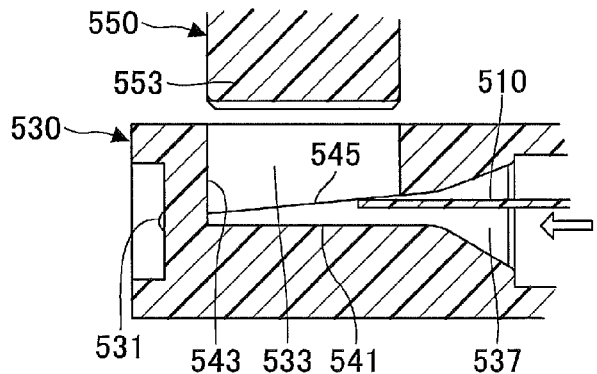
FIGS. 29A-29D are schematic diagrams for describing the positioning of the optical waveguide of the fifth embodiment.

The distal end of the optical waveguide 510 inserted into the insertion hole 537 advances along the inclined surface 545 as illustrated in FIG. 29A until reaching a position abutting the distal end reference surface 543 as illustrated in 29B. By inserting the distal end of the optical waveguide 510 along the inclined surface 545, the optical waveguide 510 can be installed in a manner having its lower surface contacting the reference surface 541. By contacting the distal end of the optical waveguide 510 and the distal end reference surface 543, the position of the optical waveguide 510 is defined with respect to the depth direction.

Figure 29B:
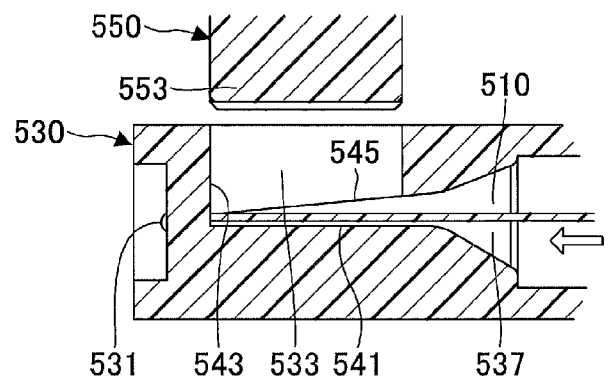
Figure 29C:
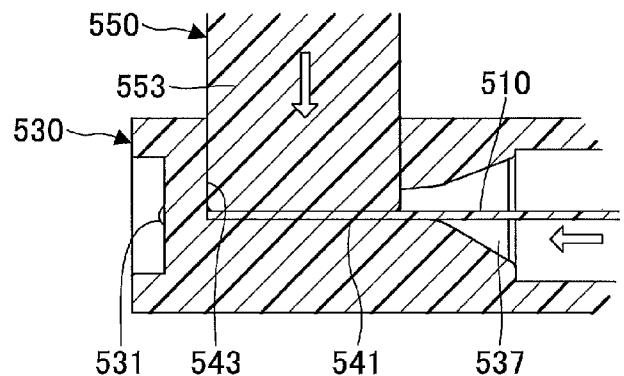
Figure 29D:
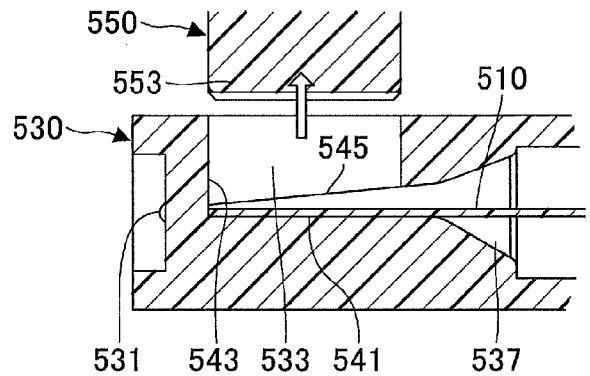

Then, the jig 550 is inserted into the connector body 530 as illustrated in FIG. 29C in a state where the optical waveguide 510 is installed in the connector body 530 as illustrated in FIG. 29B. When the jig 550 is inserted into the connector body 530, the upper surface of the optical waveguide 510 is pushed by the center pressing part 553 of the jig 550, so that the bottom surface of the optical waveguide 510 contacts with the reference surface 541, and the position of the optical waveguide 510 is defined with respect to the height direction. Further, the position of the optical waveguide in a width direction is defined as the optical waveguide 510 is moved in the width direction by the first guide 552a or the second guide 554a. After the position of the optical waveguide 510 is defined as described above, the jig 550 is removed from the connector 530 as illustrated in FIG. 29D.

By defining the positions of the optical waveguide 510 with respect to the height direction and the width direction by using the jig 550, the end surfaces of the multiple cores 511 are provided facing corresponding lenses of the lens array 531 of the connector body 530.

With the optical connector 500 and the jig 550 of the fifth embodiment, the position of the optical waveguide 510 can be defined by inserting the jig 550 into the connector body 530. Further, high accuracy alignment between the multiple cores 511 and the lens array 531 can be achieved with a simple configuration.

Sixth Embodiment

Next, a sixth embodiment of the present invention is described with reference to the accompanying drawings. In the sixth embodiment, like components/parts are denoted with like reference numerals as the reference numerals of the first-fifth embodiments and are not further explained.

(Optical Connector)

Figure 30:
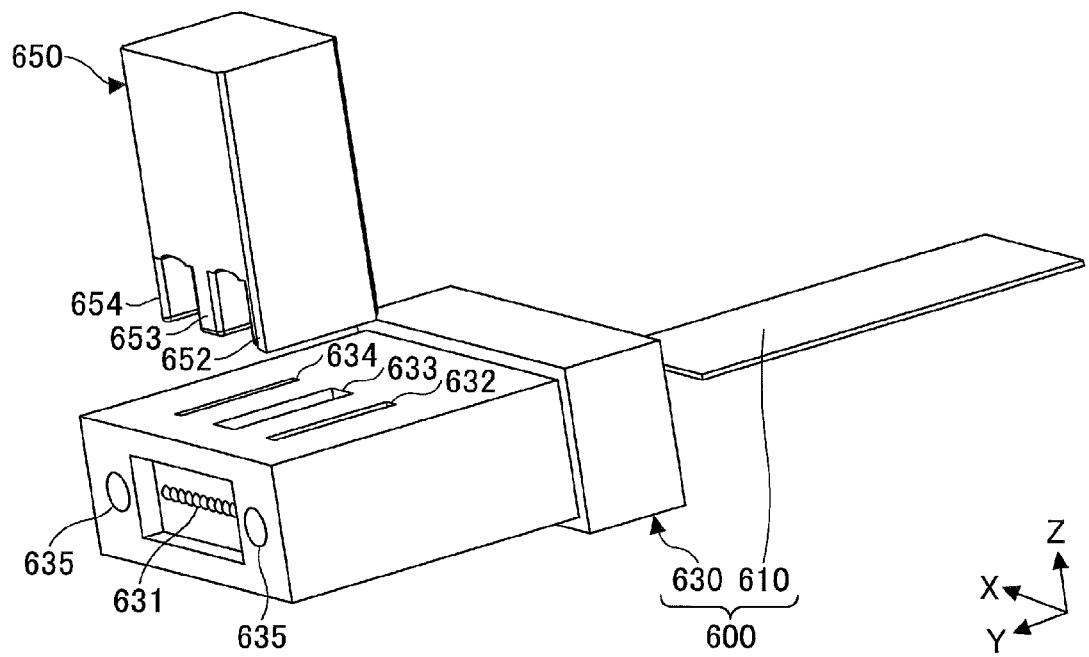
FIG. 30 is a schematic diagram illustrating configurations of an optical connector and a jig according to a sixth embodiment of the present invention.

FIG. 30 is a schematic diagram illustrating a configuration of an optical connector 600 and a jig 650 according to the sixth embodiment. As illustrated in FIG. 30, the optical connector 600 includes an optical waveguide 610 and a connector body 630. The jig 650 defines the position of the optical waveguide 610 in the connector body 630.

The optical waveguide 610 has a flat film-like shape. Multiple cores 11 that propagate light are arranged inside the optical waveguide 610.

The connector body 630 includes a lens array 631, a first opening 632, a second opening 633, a third opening 634, and a connection pin hole 635. The connector body 630 is molded by using a resin that is transparent with respect to a propagated light. The lens array 631 has multiple lenses arranged in the X direction. Each lens is provided in a manner facing an end of a corresponding core 611 of the optical waveguide 610 to be set in the connector body 630.

The first opening 632, the second opening 633, and the third opening 634 are slit-like openings of the connector body 630 that are elongated in the depth direction of the connector body 630 and lead to an installation space of the optical waveguide 610. The first opening 632, the second opening 633, and the third opening 634 are provided on an upper surface of the connector body 630. The position of the optical waveguide 610 to be inserted into the connector body 630 is defined by the jig 650 in a manner that the multiple cores 611 of the optical waveguide 610 face the lens array 631 of the connector body 630.

The jig 650 includes a positioning part 652, a center pressing part 653, and a side pressing part 654 that protrude downward. The positioning part 652, the center pressing part 653, and the side pressing part 654 are inserted in a first opening 632, a second opening 633, and a third opening 634, respectively, and define the position of the optical waveguide 610 set in the connector body 630 with respect to the height direction and width direction.

(Connector Body)

Figure 31A:
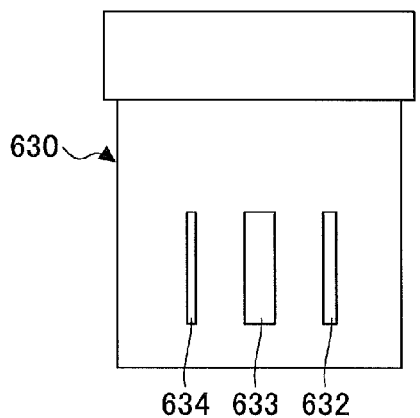
FIGS. 31A-31E are schematic diagrams illustrating configurations of a connector body of the sixth embodiment.
Figure 31B:
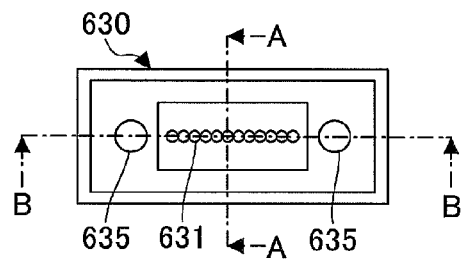
Figure 31C:
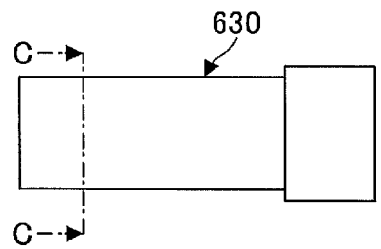
Figure 31D:
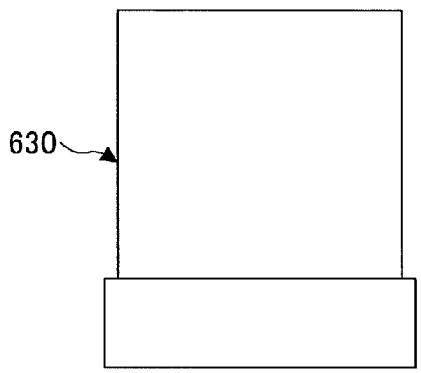
Figure 31E:
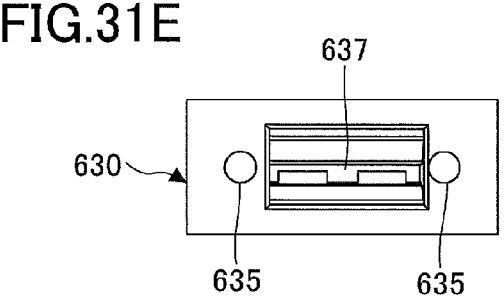

FIGS. 31A-31E are schematic diagrams illustrating the connector body 630 of the sixth embodiment. FIG. 31A is a plan view of the connector body 630, FIG. 31B is a front view of the connector body 630, FIG. 31C is a side view of the connector body 630, FIG. 31D is a bottom view of the connector body 630, and FIG. 31E is a rear view of the connector body 630.

The first opening 632, the second opening 633, and the third opening 634 are provided on the upper surface of the connector body 630 as illustrated in FIG. 31A. The lens array 631 is provided on the front surface of the connector body 630 as illustrated in FIG. 31B. The connection pin holes 635 are provided on the front surface of the connector body 630 having the lens array 631 therebetween with respect to the width direction of the connector body 630. The insertion hole 637 into which the optical waveguide 610 is inserted is provided on the rear surface of the connector body 630 as illustrated in FIG. 31E.

Figure 32A:
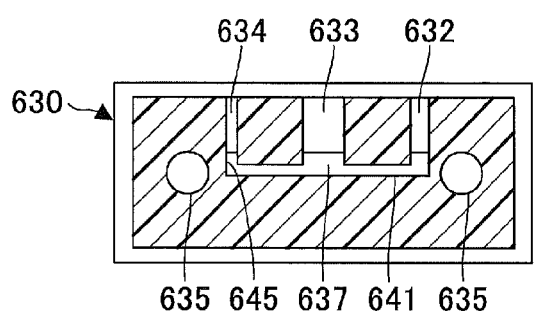
FIGS. 32A-32C are cross-sectional views illustrating configurations of the connector body of the sixth embodiment.
Figure 32B:
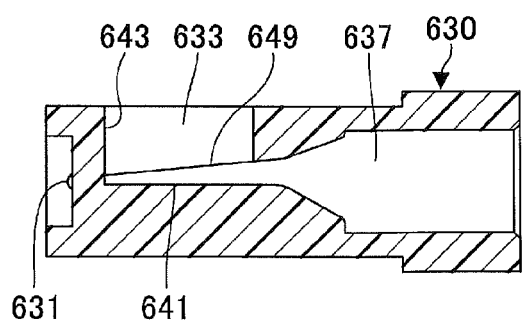
Figure 32C:
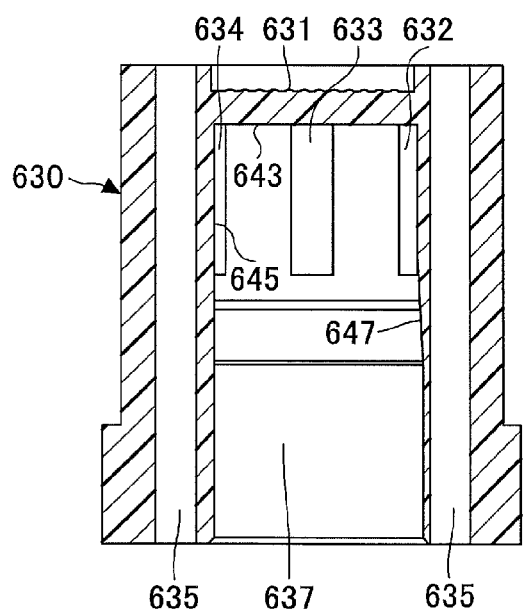

FIGS. 32A-32C are cross-sectional views illustrating configurations of the connector body 630 of the sixth embodiment. FIG. 32A is a cross-sectional view taken along line C-C of FIG. 31C. FIG. 32B is a cross-sectional view taken along line A-A of FIG. 31B. FIG. 32C is a cross-sectional view taken along line B-B of FIG. 31B.

A space for coupling with the first opening 632, the second opening 633, and the third opening 634 with respect to the insertion hole 637 is formed inside the connector body 630. The optical waveguide 610 is installed in the connector body 630 by being inserted into the space. As illustrated in FIG. 32A and 32B, the connector body 630 includes a first reference surface 641 that defines the position of the optical waveguide 610 with respect to the height direction in a manner that the first reference surface 641 contacts the lower surface of the optical waveguide 610 and the end surface of the core 611 of the optical waveguide 610 faces the lens array 31.

As illustrated in FIG. 32B, the connector body 630 includes a first inclined surface 649 that faces the first reference surface 641 and narrows the space between itself and the first reference surface 641 toward the lens array 631. The optical waveguide 610 is inserted from the insertion hole 637 and guided to a position in which a distal end of the optical waveguide 610 passes between the first reference surface 641 and the first inclined surface 649 and abuts a distal end reference surface 643. By guiding the optical waveguide 610 along the first inclined surface 649 when inserting the optical waveguide 610 into the connector body 630, the optical waveguide 510 can be provided in a manner that the lower surface of the optical waveguide 610 contacts the first reference surface 641 and is positioned in the vicinity of a reference position with respect to the height direction.

As illustrated in FIGS. 32B and 32C, the connector body 630 includes the distal end reference surface 643 that contacts the distal end of the optical waveguide 610 and defines the position of the optical waveguide 610 with respect to the depth direction. The optical waveguide 610 inserted from the insertion hole 637 is provided in the connector body 630 in a manner that its distal end contacts the distal end reference surface 643 and its lower surface contacts the first reference surface 641.

As illustrated in FIGS. 32A and 32C, the connector body 630 includes the second reference surface 645 that contacts the width direction end of the optical waveguide 610 and defines the position of the optical waveguide 610 with respect to the width direction. As illustrated in FIG. 32C, the connector body 630 includes a second inclined surface 647 facing the second reference surface 645 in a manner that a space between the second reference surface 645 and the second inclined surface 649 becomes narrower toward the lens array 631.

The optical waveguide 610 inserted from the insertion hole 637 is provided in the connector body 630 in a manner that one width direction end of the optical waveguide 610 is guided by the second inclined surface 647 and the other width direction end of the optical waveguide 610 is positioned in the vicinity of the second reference surface 645. Further, the optical waveguide 610 is inserted into the connector body 630 to a position in which the distal end of the optical waveguide 610 contacts the distal end reference surface 643 and the lower surface of the optical waveguide 610 contacts the first reference surface 641.

(Jig)

FIGS. 33A-33D are schematic diagrams illustrating the jig 650 of the sixth embodiment. FIG. 33A is a plan view of the jig 650. FIG. 33B is a left side view of the jig 650. FIG. 33C is a front view of the jig 650. FIG. 33D is a right side view of the jig 650. FIG. 33E is a bottom view of the jig 650.

As illustrated in FIGS. 33C and 33E, the jig 650 includes the positioning member 652, the center pressing part 653, and the side pressing part 654 that protrude from a lower surface of the jig 650.

In a state where the jig 650 is inserted into the connector body 630, the center pressing part 653 contacts the upper surface of the optical waveguide 610 and presses the optical waveguide 610 to the first reference surface 641 of the connector body 630. Further, the side pressing part 654 contacts the upper surface of the width direction end of the optical waveguide 610 and presses the optical waveguide 610 to the first reference surface 641 of the connector body 630. Moreover, the positioning part 652 contacts the width direction end of the optical waveguide 610. By providing the optical waveguide 610 in a manner that the width direction end of the optical waveguide 610 contacts the positioning part 652 and the second reference surface 645 of the connector body 630, the position of the optical waveguide 610 can be defined with respect to the width direction.

As illustrated in FIG. 33A, the jig 650 includes first air-vent grooves 651 provided on the four corners of the jig 650. In a state where the positioning part 652 and the side pressing part 654 are inserted in corresponding first and third openings 632, 634, the first air-vent grooves 651 and the sidewalls of the first and third openings 632, 634 form a gap that leads from an installation space of the optical waveguide 610 to the outside of the connector body 630. The jig 650 can be easily mounted to the connector body 630 because the air inside the connector body 630 is released outside from the first air-vent grooves 651 when the jig 650 is inserted into the connector body 630.

As illustrated in FIG. 33C, the jig 650 includes second air-vent grooves 657 provided between the positioning part 652 and the center pressing part 653 and between the center pressing part 653 and the side pressing part 654. The jig 650 can be easily mounted to the connector body 630 because the air inside the connector body 630 is released outside from the second air-vent grooves 657 when the jig 650 is inserted into the connector body 630.

A peripheral part of each of the positioning part 652, the center pressing part 653, and the side pressing part 654 is chamfered as illustrated in FIGS. 33C and 33E. The chamfered parts of the positioning part 652, the center pressing part 653, and the side pressing part 654 forms gaps between the sidewalls of the first opening 632, the second opening 633, and the third opening 634, respectively. By allowing air to be released outside from the chamfered parts, the jig 650 can be further easily mounted to the connector body 630.

Figure 34:
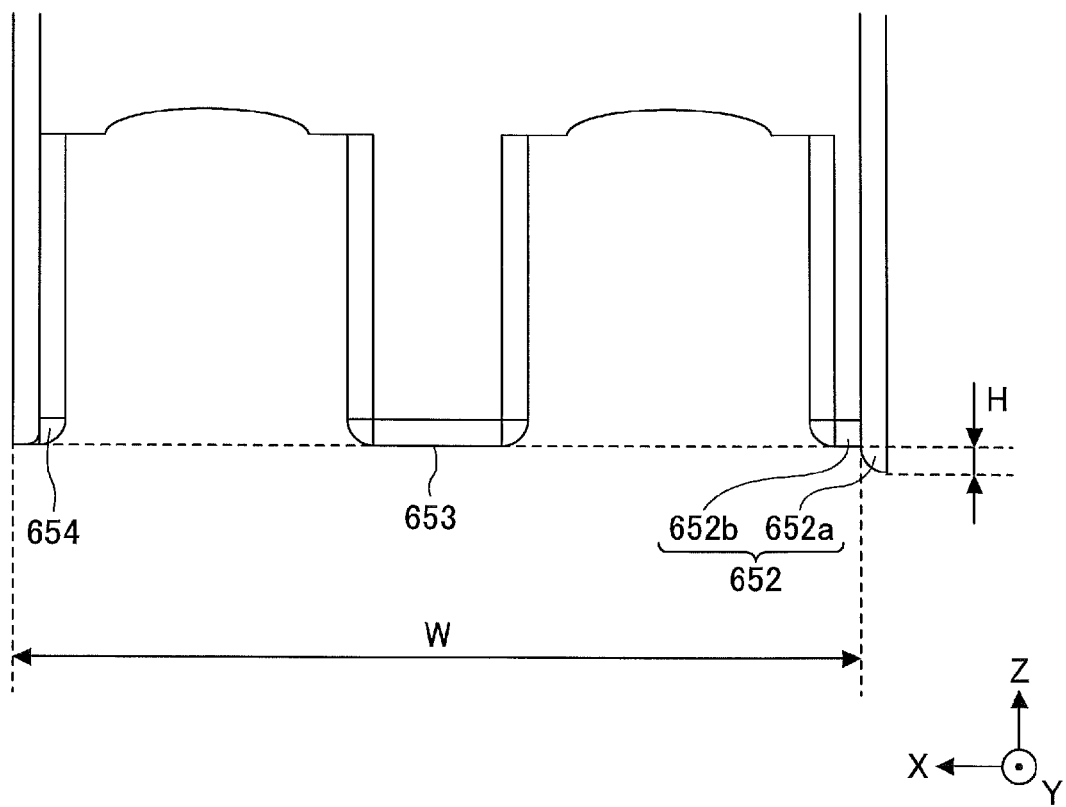
FIG. 34 is an enlarged view illustrating the jig of the sixth embodiment.

FIG. 34 is an enlarged view of the jig 650 of the sixth embodiment.

The positioning part 652 includes a first guide 652a provided on a width direction end of the jig 650 and a pressing part 652b provided on an inner side of the guide 652a. The guide 652a includes an inner surface that is inclined and tapered toward a lower end of the guide 652a.

(Positioning of Optical Waveguide)

FIGS. 35A-35D are schematic diagrams for describing the positioning of the optical waveguide 610 of the sixth embodiment.

Figure 35A:
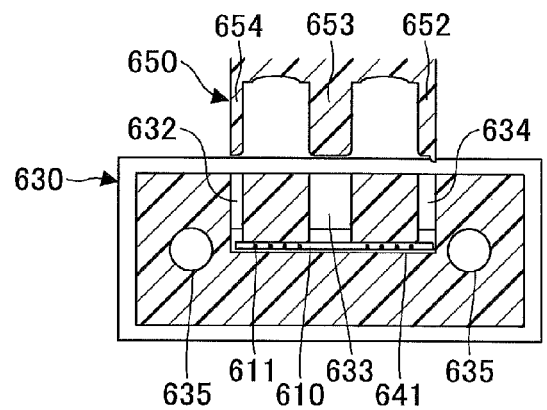
FIGS. 35A-35D are schematic diagrams for describing the positioning of an optical waveguide of the sixth embodiment.

As illustrated in FIG. 35A, the optical waveguide 610 having arranged multiple cores 611 is set on the first reference surface 641 in a manner that a distal end of the optical waveguide 610 abuts a distal end reference surface 643 (not illustrated in FIGS. 35A-35D) of the connector body 630. In this state where the optical waveguide 610 is set in the connector body 630, the positioning part 652, the center pressing part 653, and the side pressing part 654 of the jig 650 are inserted into the first opening 632, the second opening 633, and the third opening 634 of the connector body 630, respectively.

Figure 35B:
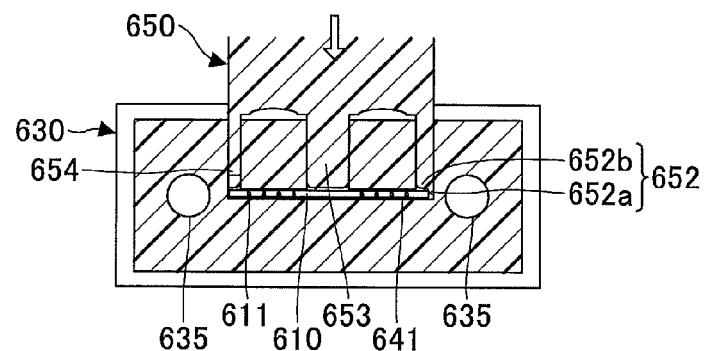

When the jig 650 is inserted into the connector body 630 as illustrated in FIG. 35B, the guide 652a of the positioning part 652 contacts the width direction end (right end in FIG. 35B) of the optical waveguide 610. When the jig 650 is further inserted into the connector body 630 in the state where the guide 652a is contacting the optical waveguide 610, the inclined inner surface of the guide 652a pushes the optical waveguide 610 and causes the optical waveguide 610 to move leftward in FIG. 35B.

Figure 35C:
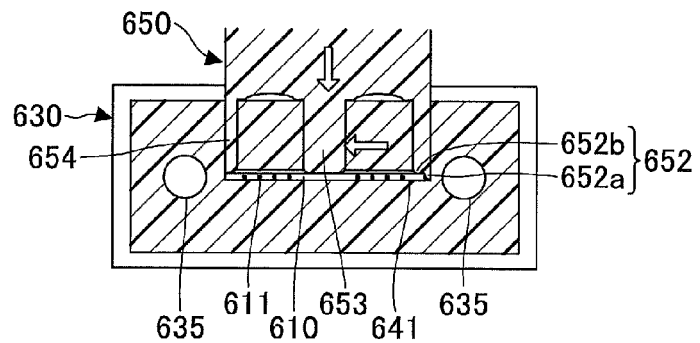

As illustrated in FIG. 35C, when the jig 650 is inserted completely into the connector body 630, the center pressing part 653, the pressing part 652b, and the side pressing part 654 press the optical waveguide 610 to the first reference surface 641, so that the position of the optical waveguide 610 is defined with respect to the height direction. The optical waveguide 610 that is pushed in the arrow direction in FIG. 35B by the first guide 652a is fixed in place by having the width direction ends contact the guide 652a and the second reference surface 645, respectively. Thereby, the position of the optical waveguide 610 is defined with respect to the width direction.

Figure 35D:
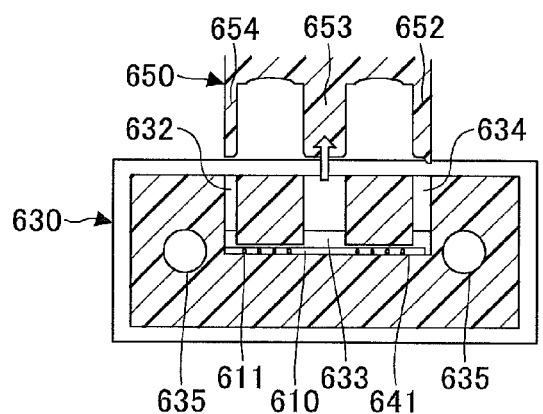

After the position of the optical waveguide 610 is defined, the jig 650 inserted into the connector body 630 is removed from the connector body 630 as illustrated in FIG. 35D. When the position of the optical waveguide 610 is defined by the jig 650, the optical waveguide 610 is fixed to the connector body 630 by using an adhesive or the like.

By defining the positions of the optical waveguide 610 with respect to the height direction and the width direction by using the jig 650, the end surfaces of the multiple cores 611 are provided facing corresponding lenses of the lens array 631 of the connector body 630.

With the optical connector 600 and the jig 650 of the sixth embodiment, the position of the optical waveguide 610 can be defined by inserting the jig 650 into the connector body 630. Further, high accuracy alignment between the multiple cores 611 and the lens array 631 can be achieved with a simple configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical connector comprising:
   an optical waveguide having a plurality of cores for propagating light arranged in a width direction;
   a connector body including a distal end reference surface that contacts a distal end of the optical waveguide, a first reference surface that contacts a first surface of the optical waveguide, a lens array that face the plurality of cores, and an opening; and
   a positioning member that is mounted to the opening, the positioning member including a pressing part that contacts a second surface of the optical waveguide and presses the optical waveguide to the first reference surface, and a first positioning part that contacts a first side of the optical waveguide in the width direction.

2. The optical connector as claimed in claim 1, wherein the first positioning part includes an inclined surface formed on a distal end thereof.

3. The optical connector as claimed in claim 1,
   wherein the positioning member includes a second positioning member that contacts a second side of the optical waveguide that is opposite to the first end with respect to the width direction.

4. The optical connector as claimed in claim 3, wherein the second positioning part includes an inclined surface formed on a distal end thereof.

5. The optical connector as claimed in claim 1,
   wherein the connector body includes a second reference surface that contacts a second side of the optical waveguide opposite to the first end in the width direction.

6. The optical connector as claimed in claim 1,
   wherein the connector body includes a second reference surface that contacts a second side of the optical waveguide opposite to the first end, and a guide surface facing the second reference surface, and
   wherein a space between the second reference surface and the guide surface becomes narrower toward the distal end reference surface.

7. The optical connector as claimed in claim 1, wherein the pressing part is configured to press a part of the optical waveguide in which the plurality of cores are not provided therein.

8. The optical connector as claimed in claim 1,
   wherein the positioning member includes an air-vent groove to be provided between a sidewall of the opening, that leads from an installation space of the optical waveguide to the outside of the connector body.

9. A method for manufacturing an optical connector, the optical connector including an optical waveguide, a connector body, and a positioning member, the method comprising:
- mounting the optical waveguide to the connector body, so that a distal end of the optical waveguide contacts a distal end reference surface of the connector body and a first surface of the optical waveguide contacts a first reference surface of the connector body; and
- defining a position of the optical waveguide by inserting a jig into an opening of the connector body;
- wherein the jig includes a pressing part that contacts a second surface of the optical waveguide and presses the optical waveguide to the first reference surface, and a first positioning part that contacts a side end part of the optical waveguide in a width direction of the optical connector.

10. An optical connector to which an optical waveguide is connected, the optical connector comprising:
- a connector body that includes a first reference surface that contacts a distal end of the optical waveguide, a second reference surface that contacts a first surface of the optical waveguide and an opening; and
- a positioning member mounted to the opening, the positioning member including a pressing part that contacts a second surface of the optical waveguide opposite to the first surface and presses the optical waveguide to the second reference surface, and a first positioning part that contacts a side of the optical waveguide in its width direction.

* * * * *